(12) United States Patent
Lyras

(10) Patent No.: US 8,571,910 B2
(45) Date of Patent: Oct. 29, 2013

(54) SYSTEM AND METHOD FOR IDENTIFYING RELEVANT INFORMATION FOR AN ENTERPRISE

(71) Applicant: Dimitris Lyras, London (GB)

(72) Inventor: Dimitris Lyras, London (GB)

(*) Notice: Subject to any disclaimer, the term of this patent is extended or adjusted under 35 U.S.C. 154(b) by 0 days.

(21) Appl. No.: 13/668,525

(22) Filed: Nov. 5, 2012

(65) Prior Publication Data

US 2013/0080207 A1 Mar. 28, 2013

Related U.S. Application Data

(63) Continuation of application No. PCT/EP2010/056273, filed on May 7, 2010.

(51) Int. Cl.
*G06Q 40/00* (2012.01)
(52) U.S. Cl.
USPC ........................................ 705/7.11; 705/7.42
(58) Field of Classification Search
USPC ................................................ 705/7.11, 7.42
See application file for complete search history.

(56) References Cited

U.S. PATENT DOCUMENTS

| | | | |
|---|---|---|---|
| 5,465,221 A | 11/1995 | Merat et al. | |
| 5,895,453 A | 4/1999 | Cook | |
| 6,327,574 B1 | 12/2001 | Kramer et al. | |
| 6,405,159 B2 | 6/2002 | Bushey et al. | |
| 6,845,370 B2 | 1/2005 | Burkey et al. | |
| 6,961,687 B1 | 11/2005 | Myers, Jr. et al. | |
| 7,350,138 B1 | 3/2008 | Swaminathan et al. | |
| 7,577,665 B2 | 8/2009 | Ramer et al. | |
| 7,603,360 B2 | 10/2009 | Ramer et al. | |
| 2004/0093232 A1 | 5/2004 | Murray | |
| 2008/0077479 A1 | 3/2008 | Carter et al. | |
| 2013/0080207 A1* | 3/2013 | Lyras | 705/7.28 |

OTHER PUBLICATIONS

PCT/EP2010/056273, International Search Report mailed Nov. 23, 2012.
Ashley, Kevin D., "Case-Based Reasoning and its Implications for Legal Expert Systems," Artificial Intelligence and Law, vol. 1, pp. 113-208; 1992.
Kolodner, Janet L., "An Introduction to Case-Based Reasoning," Artificial Intelligence Review, vol. 6, pp. 3-34; 1992.

* cited by examiner

*Primary Examiner* — Thomas Dixon
*Assistant Examiner* — Benjamin S Fields
(74) *Attorney, Agent, or Firm* — Wiggin and Dana LLP; Gregory S. Rosenblatt

(57) ABSTRACT

A system and method are provided for finding and retrieving information within an enterprise that is relevant to enterprise problems, enterprise opportunities, and unexpected or interesting events. The method includes scanning content related to a process conducted by an enterprise, where the process includes one or more process steps; identifying a problem, opportunity or event associated with a process step (an enterprise stress point); indexing the scanned content with respect to the enterprise stress point; determining whether the scanned content is information relevant to the problem, opportunity or event; and providing relevant information to a user. The relevant information includes a description or discussion of a contemporaneous or previous experience of the enterprise regarding the problem, opportunity or event.

34 Claims, 15 Drawing Sheets

SYSTEM AND METHOD FOR IDENTIFYING RELEVANT INFORMATION FOR AN ENTERPRISE

CROSS-REFERENCE TO RELATED APPLICATION

This patent application is a continuation of pending International Patent Application PCT/EP2010/056273 that designates the United States and is titled "System and Method for Identifying Relevant Information for an Enterprise" that was filed on May 7, 2010. The disclosure of PCT/EP2010/056273 is incorporated by reference herein in its entirety.

TECHNICAL FIELD

This disclosure relates to enterprise software, and more particularly to a software aid for finding information which is relevant to problems, opportunities, and/or unexpected or interesting events affecting processes conducted by the enterprise.

BACKGROUND OF THE DISCLOSURE

An enterprise (which may be any organization carrying on activities for some purpose) generally has goals and processes designed to achieve those goals. Problems in the enterprise will generally impact the success of one or more processes; these problems must be identified in a focused and efficient manner. Persons in the enterprise (users of an enterprise system) need to be alerted to problems that may cause a risk to processes for which they are responsible. A user needing to solve a problem will want to have information at his disposal which is relevant to the problem, particularly information about contemporaneous and past experiences in the enterprise that are relevant to the problem. The user will also want to collaborate with other users on solving the problem.

Accordingly, it is desirable to implement a system that identifies and retrieves information that is relevant to a problem associated with a process, and directs that information to users most concerned with the problem.

BRIEF SUMMARY OF THE DISCLOSURE

In accordance with the disclosure, a system and method are provided for finding and retrieving information within an enterprise that is relevant to enterprise problems, enterprise opportunities, and unexpected or interesting events. As the system searches for enterprise information, it indexes current items (e.g. circulating e-mails) and past items (e.g. archived memos) to enrich the knowledge of the system relating to the problem, opportunity, or event.

According to a first aspect of the disclosure, a system for finding information relevant to a process performed by an enterprise or to an enterprise stress point of said process includes a computing device configured to scan content related to a process conducted by an enterprise, where the process includes one or more process steps; identify a problem, opportunity or event (an enterprise stress point) associated with the process step; index the scanned content with respect to the enterprise stress point; determine whether the scanned content is information relevant to the problem, opportunity or event; and provide relevant information to a user. The relevant information includes a description or discussion of a previous experience of the enterprise (or related enterprises) regarding the problem, opportunity or event. The scanned content may include e-mail communication within, to or from the enterprise; documents produced by the enterprise; application data related to the process including business objects; and/or Web content accessible to the enterprise. The enterprise stress point is a problem, opportunity, or unexpected or interesting event and relates to other stress points further describing a risk, a cause, an effect, or a remedy.

Determining whether information is relevant to the problem, opportunity or event may further include determining the impact of completion of a process step on achievement of a goal related to a process including that process step; this is termed the goal proximity of the process step. The goal proximity of a process step may also be used to determine risk, which is an important relevance criterion.

A determination of goal proximity may also be used to find similar processes which, through similarity in their generic aspects and similarity of proximity to a goal, are considered similar; experiences related to these similar processes are returned by the system for the attention of the users.

Determining relevance may be facilitated by identifying processes which are characterized in the system by their generic process components, such that an inference of similarity or relevance between processes can be drawn through their generic aspects. In addition, endemic problems or opportunities embedded in processes can establish further similarity or relevance between processes.

The system may include a scanner for scanning content related to a process conducted by an enterprise; a language parser for identifying concepts within the scanned content; and an index engine for indexing the scanned content with respect to a process node (the process node having associated therewith a problem, opportunity or event), and for determining whether the scanned content is information relevant to the problem, opportunity or event. The language parser and the indexing engine together assign a stress point relevance to concepts within the scanned content, thereby generating a stress point index for items of the scanned content.

The system may further include a user interface utilizing the stress point index to alert a user to a problem associated with a related set of processes; enable collaboration between users addressing a problem or opportunity associated with a process by restricting the returned information to contemporaneous and historical information related to processes for which the users in the collaboration are stakeholders, and by enabling information related to subordinate processes to be returned if that information is likely to cause risk to the processes for which the collaborating parties are stakeholders; or retrieve information including a description or discussion of a previous experience relating to a problem associated with a process. In an embodiment, the indexing engine is a middleware service.

According to another aspect of the disclosure, a user may navigate a cognitive structure retrieving past and current experiences which may be used for a variety of uses described herein.

It should be noted that, in accordance with the disclosure, when solving enterprise problems, exploiting enterprise opportunities, or explaining interesting or unexpected events occurring within the sphere of the enterprise, the relevance of an item of content or data to the enterprise may be determined entirely by relating that content or data to the relevant enterprise stress points (process nodes) and to the elements of the cognitive structure most closely related to those process nodes;

similarities between processes may be determined entirely by referring to identification of the processes and their generic process components, the goal proximity of the respective processes to their dependent processes, and the endemic problems, opportunities or events associated with the processes; and when a process node within a step is determined to present a risk, the severity of that risk may be determined entirely by referring to (i) the goal proximity of that step to its direct goal, (ii) the goal proximity of that step and its effect on further dependent goals, (iii) the estimated cost of failed goals and remedial action, and (iv) the probability of the node in question experiencing a failure.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Introduction

Figure 1:
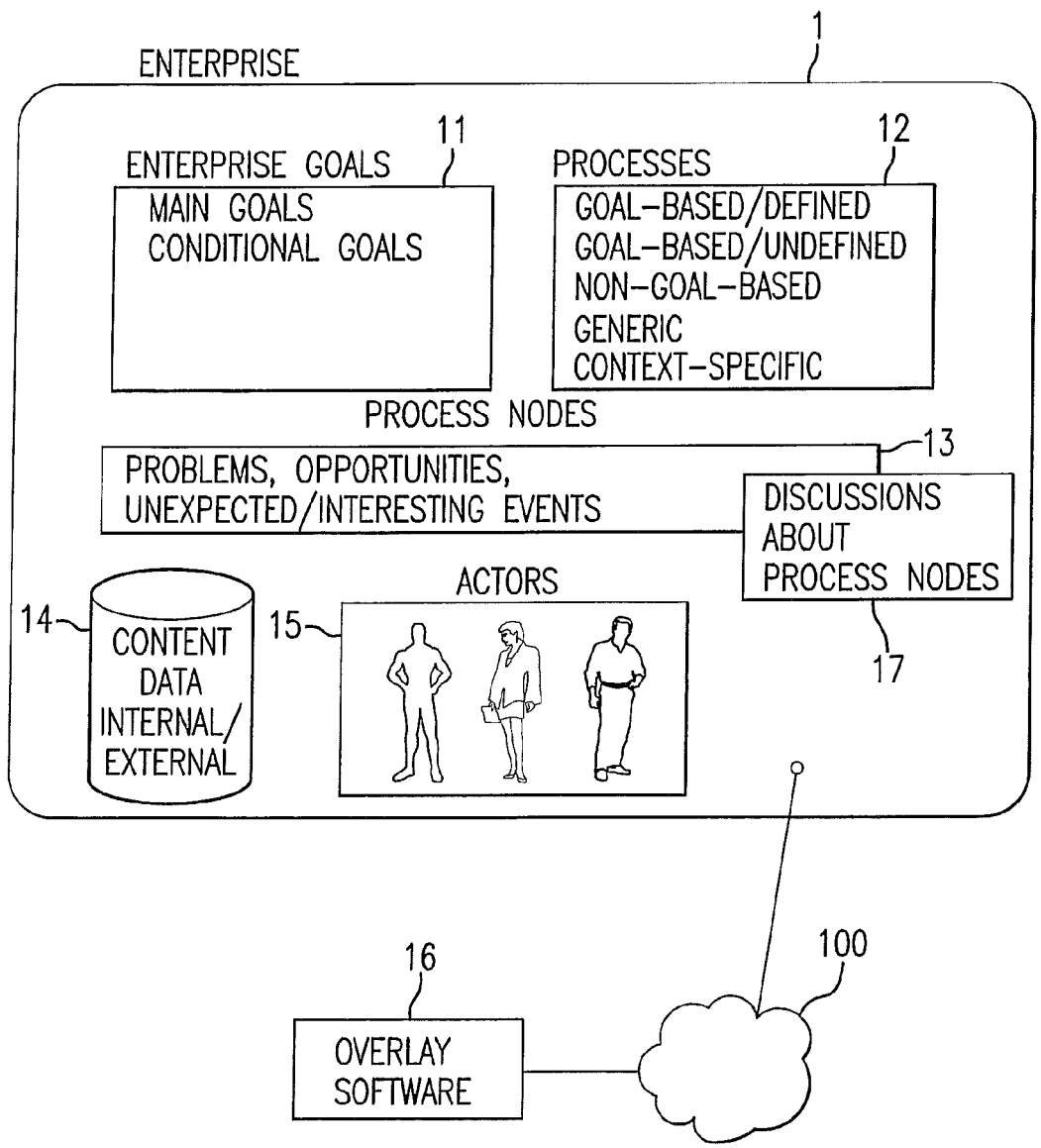
FIG. 1 schematically illustrates an enterprise having goals and processes, with software for finding relevant information linked to the enterprise, in accordance with an embodiment of the disclosure.

Software embodying the present disclosure is referred to herein as "Overlay." The Overlay is an aid for finding information within the enterprise; sources of this information are thus typically enterprise internal content and enterprise data, including communications within the enterprise and communications between the enterprise and outside parties. Another source of information is external information related to the enterprise that the enterprise wishes to access regularly. One aspect of the Overlay is that it functions as a relevance engine, as opposed to a search engine; the Overlay retrieves only information that is considered relevant to enterprise problems and opportunities and unexpected or interesting events.

The Overlay software uses relevance between enterprise processes and relevance between enterprise stress points in such processes (that is, focus points in the business that represent hazards, expectation failures, conflicts, risks, common causes and related areas of attention and knowledge), to present to the user only relevant returns from underlying data and content, so as to accomplish the following:

Provide a user of the Overlay with an overview of underlying changes in any enterprise software/e-mails that may constitute an enterprise stress point for which the user is responsible. In a large organization it is impossible for senior personnel to manually navigate and monitor all applications in this way, or to have hard wired workflows of every possible issue that might potentially constitute a problem. Since enterprise stress points are often caused by a combination of multiple events, the Overlay helps to identify those enterprise stress points and avoids excessively granular notification when it is not wanted;

Enable the user of the Overlay to access enterprise content and/or data systems (including email systems) from remote locations using a handheld device, and to render a filtered view of events affecting the enterprise stress points;

Enable the user of the Overlay to process events and co-ordinate warnings as well as enrich content with knowledge related metadata; and Enable the Overlay user to manage undesired events assisted by relevant legacy content.

Definitions

Cause: An occurrence of potential occurrence that is deemed to be a cause of an effect.

Root cause: An occurrence or potential occurrence that is deemed to be the reason the cause has occurred.

Effect: An occurrence or potential occurrence that is deemed to effect a process or plan goal or conditional goal.

Risk: A potential effect. This can be both positive when it corresponds to an opportunity or negative when it corresponds to a problem.

Diagnosis: Finding the cause of problems and explaining interesting events or causes of opportunity.

Organize. To be an abstraction of, to generalize, to group.

Goal Proximity/proximity: The percentage effect of a process step on the goal of the process to which that step belongs.

Goals or conditional goals: The goals and conditional goals for which an enterprise process has been designed.

Cognitive structure: A structure that indexes information in a way that fits known cognitive principles.

Primary means of understanding more about the problem or opportunity: The methods by which the most appropriate relevance is determined about a problem or opportunity.

Cases/discussions/descriptions/experiences: These are cases of experiences which may describe all or part of cause, effect, risk, and remedy. They may include generalized explanations and models for describing how things behave in there processes where they are assigned.

Models: Generalized cases explaining cause and effect.

Explanations: Explanations of problems or opportunities or unexpected events.

Attributes: Characteristics of entities mentioned in this disclosure.

Responsible: A situation where an actor's attributes significantly affect the outcome of a process or process step.

Problems/failures: In the present disclosure, problems and failures are considered nodes within processes where highly experienced practitioners reasonably expect problems and/or failures or unexplained phenomena or phenomena of unexplained cause and effect.

Opportunities/successes: In the present disclosure, opportunities and successes are considered nodes within processes where highly experienced practitioners reasonably expect opportunities and/or successes.

Event/unexpected event/interesting event: In the present disclosure, an event is an occurrence that to a highly experienced practitioner is reasonably considered important to the enterprise and its goals.

Process nodes: Parts of processes where highly experienced practitioners expect problems and opportunities.

Highly experienced practitioners: People who have been participating and have been responsible for a process for which they are considered highly experienced for most of their careers and are aware of the particular process and its main characteristics, and are also aware of the processes dependent and subordinate to the process for which they are considered highly experienced.

Enterprise: Any organization or collection of organizations carrying on activities for one or more known purposes; generally characterized by predictability of goals at any one time, predictability of plans and processes to achieve those goals, and actors with substantially known values, skills, knowledge, information, endurance, and emotion with respect to goals.

Enterprise activity structure: A framework of related relevance criteria that are recognized by practitioners in most domains.

Enterprise activity: Activities recognized by practitioners in each domain or in more than one domain.

External process: The external processes taking place outside the enterprise upon which some enterprise processes depend: e.g. design, construction, or education, and preparation activities that may be part of any process step; processes found to occur in the environment which are not designed to serve known goals but affect enterprise processes and goals, for example discretionary human behavior: or processes not directly related to human behavior, such as environmental phenomena.

Practitioners: People who have average experience in the enterprise.

Overlay: A system and/or method in accordance with the present disclosure.

Endemic problems/opportunities/nodes: Problems, opportunities, or unexplained/potential/occasional occurrences, at various levels of abstraction that are considered by highly experienced practitioners to be repetitive in a variety of related processes. Endemic problems/opportunities are associated with goals since problems and opportunities cannot be defined without first defining goals.

Object: An object in the domain which is part of a process.

Context: An environment in the domain within which a process takes place.

Abstracted object: An object that may be abstracted and therefore may apply to more than one domain Abstracted context: A context that may be abstracted and therefore may apply to more than one domain Domain: An industry, a department of a company, or any enterprise structure where process steps and terminology are specific and yet practitioners understand them.

Ossified: A property of an entity within the enterprise activity model which varies but is considered constant, because practitioners expect the property to be fairly constant and predictable.

Relevance criteria: Any entity which helps to build the enterprise activity model or structure Circumstance: Context, object time or similar.

Process: A series of actions serving a set of goals and conditional goals. These can range from ossified processes, to established processes, to newly established processes, to plans that are processes yet to be put in practice.

Script: A process that is performed consciously and subconsciously because it has been ossified.

Plan: A plan is a less well defined process where the steps in the process are ordered in a way fitting the current circumstances. The goal hierarchy of plans is often different from the underlying processes they incorporate.

Inanimate process: A process that does not involve human intervention (such as a chemical process) and therefore may not have goals other than the goals of the process within which it has been designed by humans to be a part. For example, corrosion is an inanimate process that is predictable and well known, but nevertheless would not be considered a goal based process.

Non goal based animate processes: Processes that people experience but are not clearly goal based such as appreciating a certain type of music or liking a certain colour. A common word for this is discretionary.

Condition: as defined in the English language and in AI.

Enterprise Goals and Processes

As shown schematically in FIG. 1, an enterprise 1 generally has goals 11 and processes 12 designed to achieve those goals. Enterprises and enterprise departments generally have the following attributes with respect to goals: collective values, collective skills, collective knowledge, collective information, collective endurance, and collective emotion. One or more enterprises may belong to a domain, defined as an industry, a department of a company, or any enterprise structure where process steps and terminology are specific and yet practitioners understand them. Practitioners in a given domain may thus be said to have shared, specific knowledge.

The goals 11 may include enterprise goals (often expressed at a high level, so that specific processes are not associated therewith), main goals (achievement of which directly affects one or more enterprise goals), and conditional goals (that is, goals that are not the primary reason for designing a process, but if not met may prevent achievement of the main goal or else may allow achievement of the main goal but render that achievement undesirable). Processes may be goal-based (generally, carried out by actors in the enterprise in furtherance of a goal), non-goal based but enacted and not usually designed by humans, or non-goal based and not enacted or designed by humans. Processes include the function of machinery or any process designed by humans for human goals but not necessarily enacted by humans. In carrying out the various processes in an enterprise, risks are encountered; problems and opportunities arise; these problems have causes, effects, risk or potential effects, and remedies.

Those parts 13 of processes where experience has shown that risks, problems and/or opportunities may present themselves, or unexpected or interesting events may occur, are termed "enterprise stress points" or "process nodes." Process nodes are often identified by experienced actors 15 within the enterprise. The Overlay software 16, which in an embodiment is accessed by the enterprise as a service over the Web 100, searches enterprise internal content and data 14, and in some cases external data also, yielding information which is indexed against the identified stress points. The indexed information then has a stress point relevance assigned thereto. The Overlay searches are natural language searches, based on the process nodes in the enterprise and the wording used to describe them. The Overlay also searches for structured data known to be related to each process node.

More generally, a process may be either internal and external, or some combination of the two; the internal process being enacted in the enterprise, and the external process taking place outside the enterprise; e.g. design, construction, or education, and preparation activities that may be part of any process step, processes found to occur in the environment which are not designed to serve known goals but affect enterprise processes and goals, for example discretionary human behaviour, or processes not directly related to human behaviour such as environmental phenomena.

Process Nodes

Figure 2:
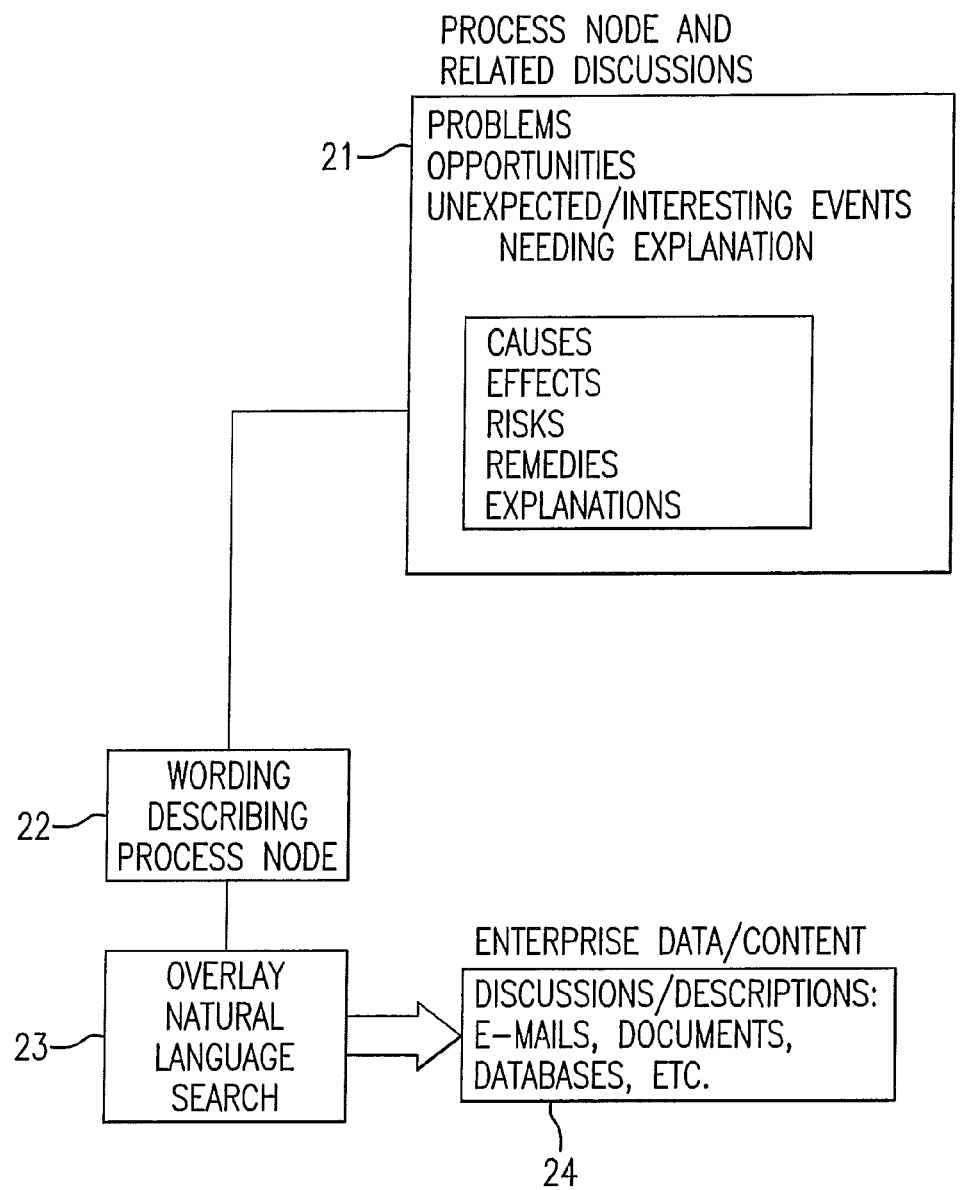
FIG. 2 schematically illustrates aspects of a process node for a process of the enterprise.

As shown schematically in FIG. 2, a process node 21 is characterized by one or more problems, opportunities and/or unexpected/interesting events in a process or in a process step of a process. The wording 22 describing a process node is used in a natural language search 23 of enterprise data and internal content (and other sources of information) 24.

Process nodes for an enterprise represent components of a cognitive structure (discussed further below). The process nodes as parts of a cognitive structure contain discussion or descriptions of problems and/or opportunities and/or events that practitioners find relevant to goals and/or processes in the enterprise, or sometimes outside the direct activities of the enterprise. Such activities outside the direct activities of the enterprise can be, but are not limited to, other enterprises; the business world; the political environment; the social environment; the physical environment; the biological environment; or any environment which significantly affects an enterprise process.

Process nodes may also include variances to the discussion and/or descriptions of potential problems or opportunities or events, as follows:
 (a) Discussion and/or description or data about a problem or opportunity or unexpected event in executing one or more of the goals or conditional goals in a process that
  (1) at the time of the discussion or description, or at a later time, was considered an effected process;
  (2) constitutes a dependent processes to the process effected;
  (3) contains a problem or opportunity that could become active should a subordinate process fail;
  (4) contains a problem or opportunity, and/or a potential problem or opportunity, in a subordinate process to the process effected.
 (b) Discussion and/or description or data regarding:
  (1) An explanation of a problem opportunity or unexpected event;
  (2) A cause analysis of a problem or opportunity or unexpected event;
  (3) A root cause (cause of a cause) analysis of a problem or opportunity or unexpected event;
  (4) A plan considered an action to remedy a problem or exploit an opportunity;
  (5) A procedure describing how to avoid a problem or how to exploit an opportunity.

Discussions or descriptions relating to a process node can be in text or in figures, or any combination that constitutes customary indication used in enterprise software or content. This could include but is not limited to spreadsheets, e-mails, documents, meta-data, data in databases, electronic messaging, voice communications, etc.

A cognitive structure, as discussed herein, is a structure having information indexed in a way that fits known cognitive principles, the cognitive principles being structured so that they relate to each other in a way that permits the relevance of the information to be determined.

Figure 3:
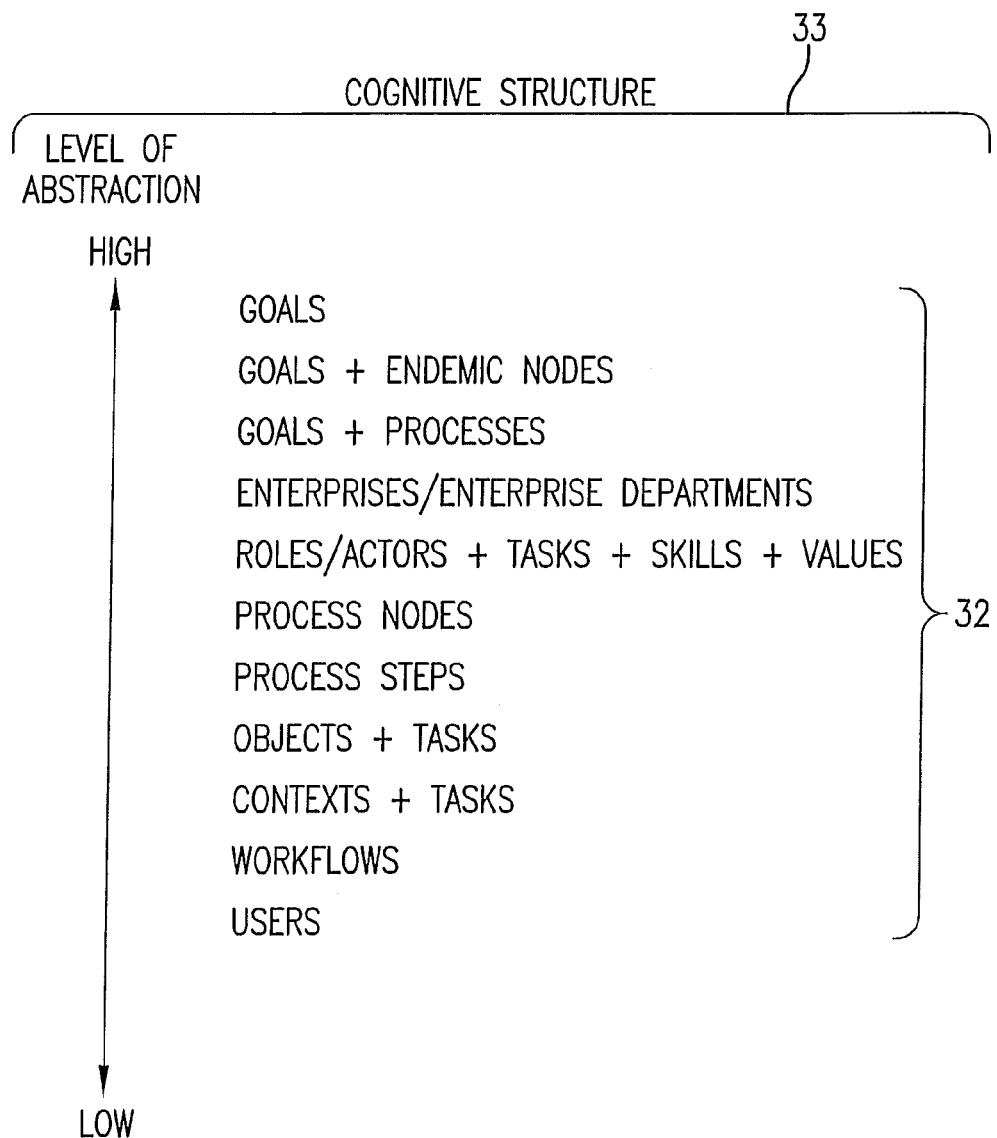
FIG. 3 schematically illustrates abstraction of activities underlying a definition of a process node.

As shown schematically in FIG. 3, a cognitive structure 33 is an abstraction of day to day activities and their related objects; these are activities and objects familiar to the average practitioner outside the domain of the enterprise because they are used in day to day enterprise activities throughout most domains. Such enterprise activities and objects 32 include but are not limited to: users, user roles, tasks, contexts in which tasks and processes take place, enterprise objects, processes, goals, skills, values, actors in a process, or any generalization of these. A given process node represents components of the cognitive structure. All nodes and entities in the cognitive structure may have abstractions and/or be abstractions of other entities.

Accordingly, cognitive structure 33 may include:
 Goals
 Goals and associated processes, and associated endemic nodes (discussed below)
 Enterprises, enterprise departments, and associated roles, actors, and attributes (e.g. skills, values etc.)
 Generalized process nodes
 Specific process nodes
 Lower level goals and associated process steps
 Tasks and the actors or roles that enact them
 Contexts and associated processes or tasks they affect
 Objects and the associated processes or tasks they affect
 Workflows
 Users The Overlay software is also a finder of information relevant to any process or process node or any element of the cognitive structure. Information retrieval methods used by the Overlay software are applied to this relevant information. These retrieval methods also apply to most elements of the cognitive structure.

The term "relevant" includes, but is not limited to: related as a process at risk, as an additional process at risk, a cause process, an abstracted cause process, additional cause processes, remedial action processes, related as a similar process to any other process, related by common context or object or abstraction of these, related by common node or abstraction, related by a common goal or conditional goal, or combinations of these.

Information is irrelevant, for the purpose of the Overlay, if it is not the primary means for understanding more about a problem, opportunity, or unexpected/interesting event.

The relevance of an item of content or data to the enterprise may be determined entirely by referring to the enterprise stress points (process nodes), as explained more fully below.

Analyzing Processes; Process Similarity

Figure 4:
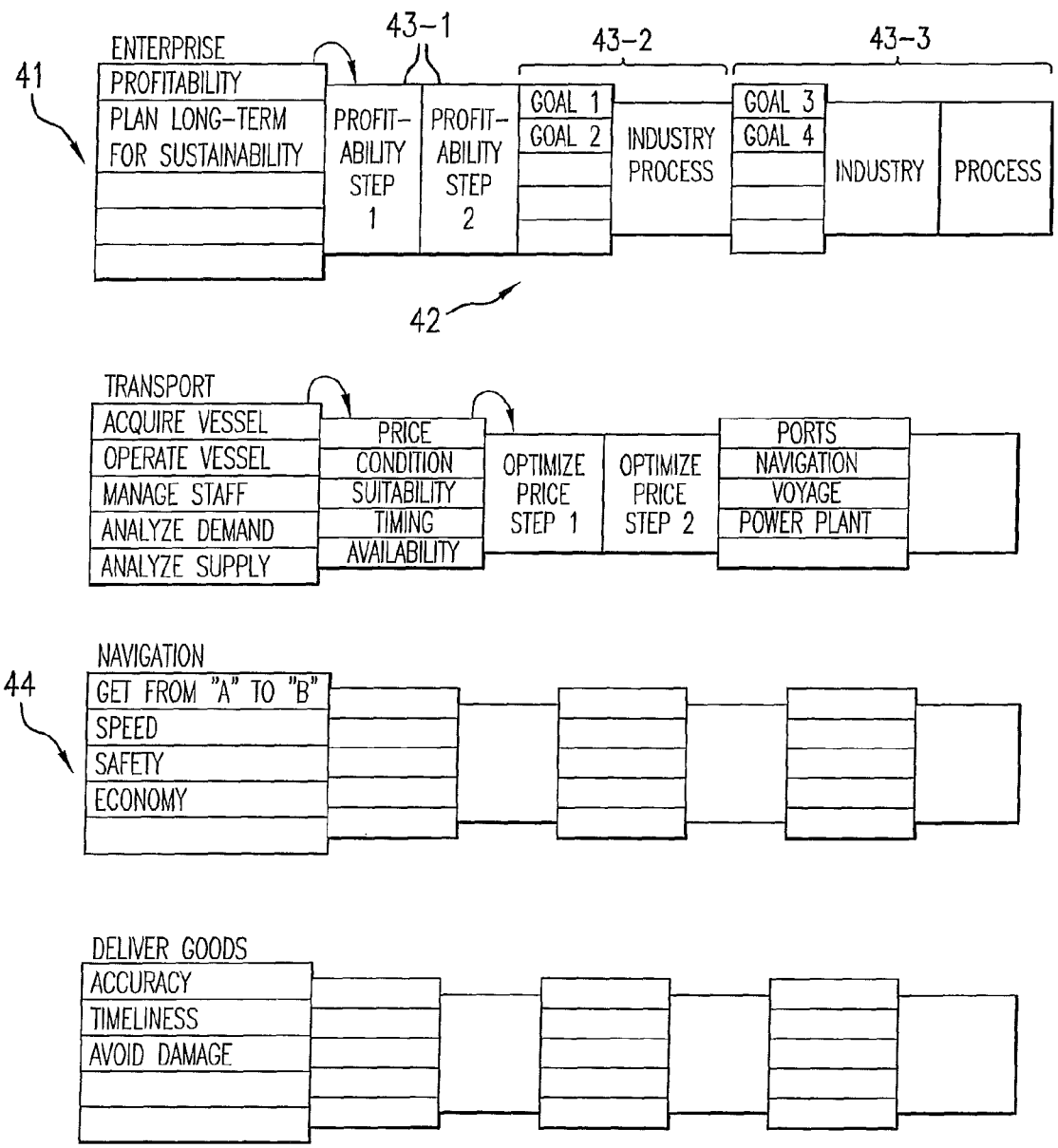
FIG. 4 illustrates goals and associated processes for an enterprise.

FIG. 4 is a schematic illustration of some goals and processes for an enterprise. In this illustration, a set of goals 41 for the overall enterprise has numerous processes designed to achieve those goals; one process 42 has steps 43. The enterprise shown is involved in the transport of goods, including specifically transport of goods by sea; accordingly, there is another set of goals 44 in the domain of the enterprise dealing with "Navigation." In this example, a process 45 for navigating from one point to another has these steps 46: seeing (e.g. finding navigational aids), moving (e.g. operating an engine), and plotting a course to the desired location. As shown in more detail in FIG. 5, the process step for "seeing" involves the need for eyeglasses; lost eyeglasses constitute a problem for that process step.

An enterprise in a different domain (e.g. military training) with different goals 47 (e.g. firing a field gun) may nonetheless have some process steps similar to the navigation process 45. The group of goals 47 includes main goals ("fire gun", "hit target") and conditional goals ("avoid other objects," "avoid explosion"); the conditional goal "avoid explosion" needs to be met so that goal "fire gun" can be achieved in the manner desired. The process 48 for achieving the goal "fire gun" includes a step 49 for "see the target." The activity "seeing" may be viewed as a generic activity relevant to both processes. In addition, process 48 includes a step 50 for "adjust gun." The process step for "adjust gun" involves the need for a wrench, a lost wrench constitutes a problem for that process step. The lost eyeglasses and lost wrench may be viewed as examples of a generic problem (that is, a generic node), namely "lost tools."

Figure 5:
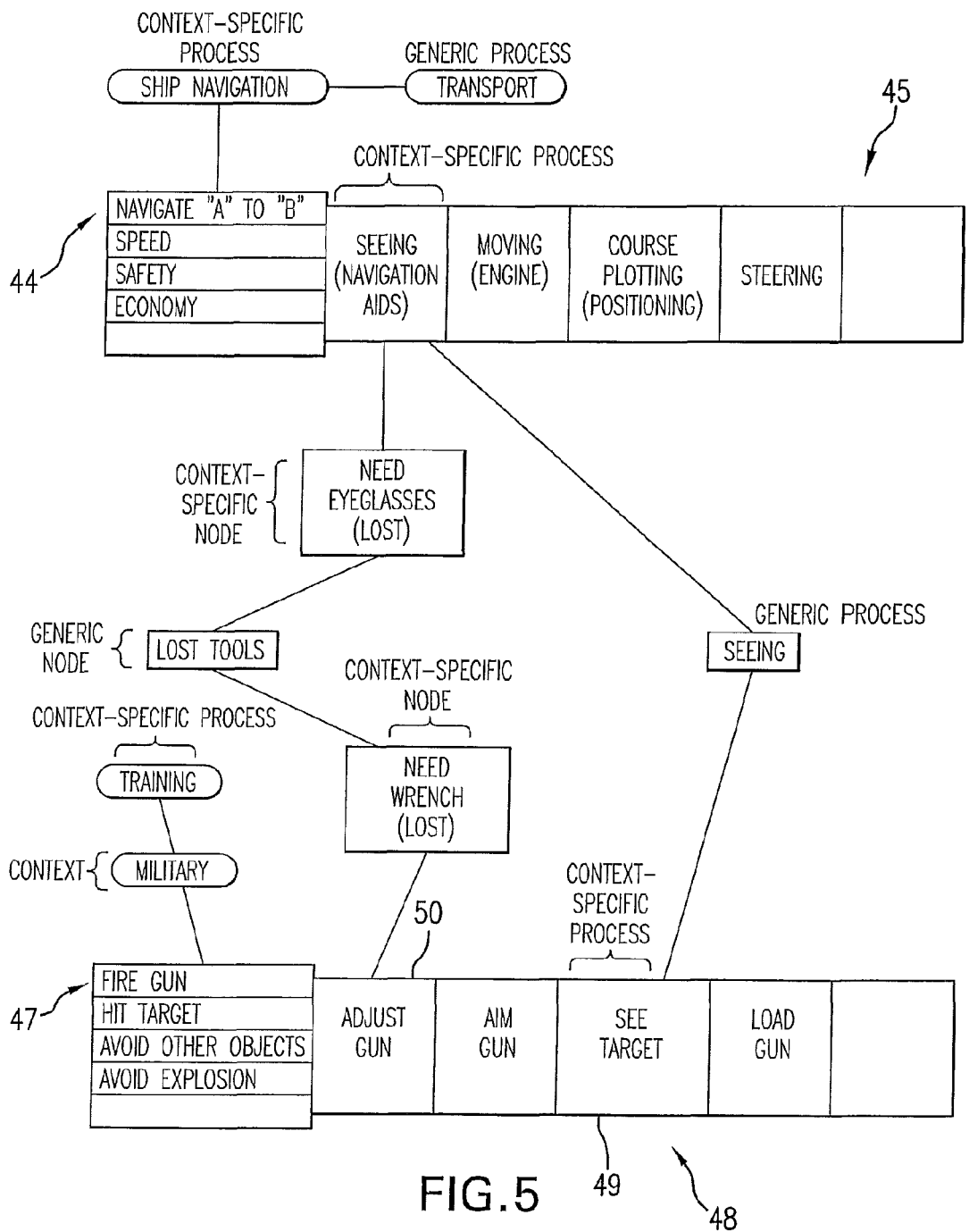
FIG. 5 illustrates some details of two processes, and problems relating to those processes.

Several nodes and processes are labelled in FIG. 5 as context-specific or generic. It can be seen that processes in different domains are nevertheless related by generic processes and generic nodes. More generally, once context-specific nodes are identified, those context-specific nodes define more generic nodes. These more generic nodes in turn define generic components of context/domain specific processes for a given domain. These generic process components and their generic nodes will exist in another domain at some level of generality and thus indicate specific nodes in this different context/domain.

One process node can be similar to another process node; this is determined by process or process step similarity which is explained in more detail herein. As shown in FIG. 5, process steps of different processes often have commonalties. When a process step is common to two processes, then the two processes are considered similar if the process step is similarly able to affect the main process goal to which it belongs. The effect that a process step has on the goal to which that step belongs is called the "goal proximity" of that process step.

The Overlay software finds cases similar to the problems and/or opportunities of a given process node by finding similar process nodes, and then indicating similar cases where the process and process node and goal proximity are similar. In this regard, it should be noted that the Overlay does not rely on a vast array of process conditions for case similarity. The Overlay evaluates process similarity from goal proximity and from similarity of nodes and abstracted nodes or endemic nodes. (Abstracted nodes or endemic nodes provide an alternate way of defining abstracted processes, because processes are devised to deal with highly abstracted endemic nodes at the most abstracted level.) In a given process, process conditions are contained within that process; finding a similar process will thus define comparable conditions. This is because the salient conditions are in fact incorporated in process nodes (problems and opportunities within the process). It follows that if the process nodes are defining criteria of a process, they are also sufficient to define the conditions within that process.

It should be noted that the Overlay searches for similarities in both processes and the nodes included therein. In general, processes are developed to enable problem nodes to be avoided and opportunity nodes to be exploited. A given process may have more than one node. It follows that node similarity is included in process similarity.

In addition, the hierarchy of the goals in a process affects a determination of similarity. Goal hierarchy of goals and conditional goals in a process determine the goal profile of a process; this is considered an additional defining characteristic of process similarity. Processes that have similar goal hierarchy are likely to be similar. Process similarity thus does not depend only on common process steps or common generalization of those process steps.

Goal Proximity; Success Probability

Figure 6A:
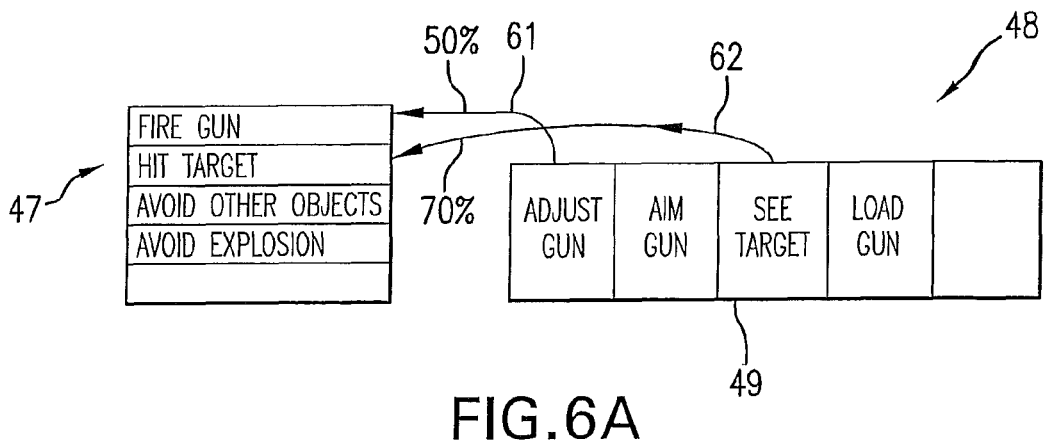
FIG. 6A illustrates goal proximity for various process steps.

In general, not every process step is equally critical to achieving success of the process goal. As noted above, the term "goal proximity" refers to the effect that a process step has on the main process goal to which that step belongs. The goal proximity of a process step may be quantified in terms of how proximate the process step is to achieving success or failure of the process goal(s) or the conditional goals. For example, as shown in FIG. 6A, achieving the goal "fire gun" is judged to be 50% dependent on completion of the process step "adjust gun". Achieving the goal "hit target" is judged to be 70% dependent on completion of the process step "see target". These relationships are shown schematically by 61 and 62 in FIG. 6A. It follows that problems in process steps with high goal proximity have an increased impact on the success of that process. Goal proximity provides an additional criterion for process similarity; processes with similar effect on goals of dependent processes, and processes which also have common generic or particular characteristics (for example, common nodes), are considered similar even if they occur in different domains.

The abundance of resources (or lack thereof) in a process is considered an attribute of the process steps within the process. Accordingly, a redundancy of resources affects the goal proximity of the process. Furthermore, a problem or opportunity in a process step affects the proximity of the process step to the goal in accordance with the abundance of resources or redundancy of processes.

Figure 6B:
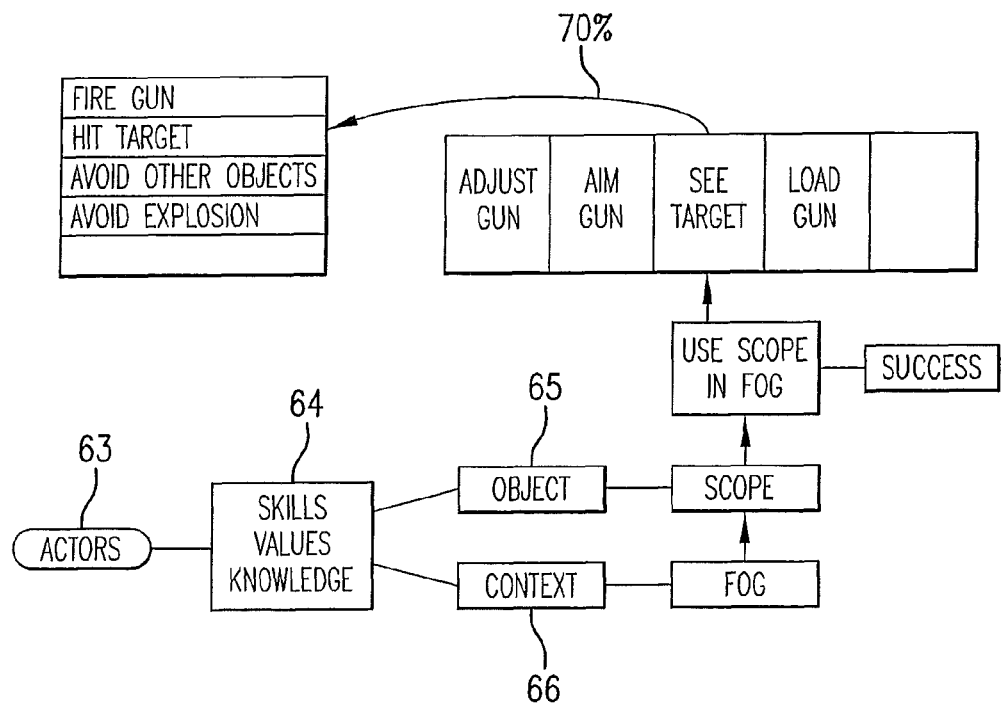
FIG. 6B illustrates interaction between actors in an enterprise and a given process step.

Actors (persons performing or otherwise concerned about a process) also affect the success of a process. As shown schematically in FIG. 6B, actors affect the process steps for which they are primarily responsible. Actors generally have these attributes: values, skills, expertise, information, endurance, and emotion. Depending on the process steps, other actor attributes may be considered relevant. The attributes in turn affect the probability of expected problems or opportunities with respect to a process step, and thus affect the goal of the process. In the example shown in FIG. 6B, actors 63 responsible for the step "see target" have skills, values and knowledge 64 which they bring to bear on both the object(s) 65 involved with the process step and the context 66 in which the step is performed. If the object used in the step "see target" is a viewing scope, and the context is fog, then the actor's skill in using the scope in fog to see the target will have a significant impact on success. It can be seen from this example that process steps themselves also have goals ("find target using scope"), and actor attributes affect these goals. In general, the process steps which the actors perform or influence significantly have goals and conditional goals, and it is the goals and conditional goals of these steps or their constituents that the attributes of the actors influence.

Generic Processes and Nodes

Processes can be abstracted into generic process groups; processes may belong to generic groups and processes may have generic process steps. For example, navigating a vessel can belong to a general process of "travel in control of a vehicle or vessel", and it can have generic constituents such as seeing, steering, planning, etc. Generic processes are processes which are not specific to a domain, and which practitioners with average expertise in another domain would recognize. In general, processes have generic components or belong to larger generic processes.

Generic processes are less context-specific processes in a given domain. As they reach a higher level of abstraction, they contain less specific and more generalized nodes. The least context specific processes may be so general as to have no specific steps and thus may be difficult to identify other than through endemic nodes (discussed further below).

Figure 7A:
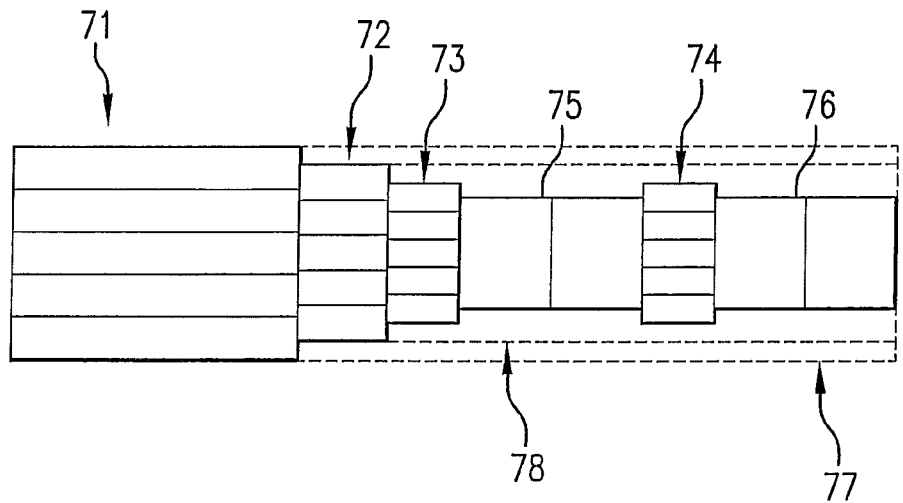
FIG. 7A schematically illustrates generic processes and more specific processes.

Generic processes may be represented schematically as shown in FIG. 7A. A set of high-level goals 71 has a set of subsidiary goals 72, which in turn has sets of subsidiary goals 73, 74. Processes 75 and 76 are designed to achieve goals 73, 74 respectively. The solid boundaries in the depiction of processes 75, 76 indicate that these processes are domain-specific processes; the dotted lines represent a generic process 77 and generic process substeps 78.

Generic processes may have nodes, contexts and objects that are generalized from the many domain processes they are found to be a part of by practitioners and the general public. They may be biased toward one or more particular domains when they have fewer attributes than if all domains are considered. This applies to (but is not limited to) contexts, objects, generalized nodes, etc.

Figure 7B:
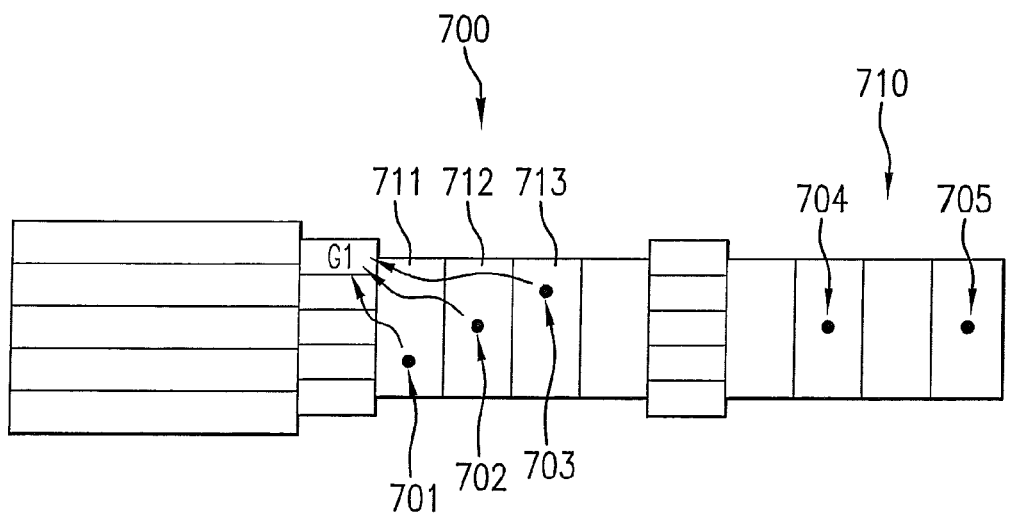
FIG. 7B schematically illustrates processes including process nodes or enterprise stress points.

Process nodes may be schematically represented as shown in FIG. 7B. A node appears in each of three process steps of process 700, and in two process steps of process 710. Nodes 701-705 each may be a risk, cause, effect or remedy related to a problem/opportunity/event occurring with respect to that process or some other process.

In process 700 shown in FIG. 7B, each of the process steps 711-713 has a goal proximity with respect to goal G1. There is also, separately, a probability of failure of the process if the node represents a risk. These concepts are used to analyze the risk associated with the process. Unlike other risk analysis approaches, in the Overlay software risk is assigned by goal proximity, and separately assessing probability. As described above, goal proximity is a percentage assigned to the degree to which a goal or conditional goal in a process is affected by the success or failure of a subordinate process. Goal proximity for processes of equal level of subordination or dependence is additive to a total of 1 or 100%. Each dependent process is dependent on the next lower level of equally subordinate level processes. For example, directing a vessel in the navigation process is dependent on propulsion and steering 100%. Propulsion and steering is 100% dependent on electrical power. At the level of the vessel directing process, there are other process steps of equal subordination such as keeping watch, voyage planning and managing personnel.

Risk is assessed in terms of goal proximity. When a process node within a step is determined to present a risk, the severity of that risk may be determined entirely by referring to the goal proximity of that step with respect to its direct goal, the goal proximity of that step with respect to further dependent goals, the cumulative cost of goal failure and the cumulative cost of remedial action of the goal failure.

Risk severity is not defined by a numerical probability of failure of a process step, or by a numerical estimate of the cost of failure. Risk severity is instead defined by a probability of a problem node actually presenting the problem, and by the proximity of this node failure to goals of the immediate process and of more distant dependent processes. The risk severity may then be multiplied by the cost of the goal failures potentially affected, as in other methods. It will be appreciated that goal proximity is a better defined probability criterion, being based not only on frequency of process step failure, but also on resource redundancy.

Risk, or potential opportunity, may be estimated determined more qualitatively by availability of relevant experiences within the processes likely to be affected by a problem, as determined by the goal proximity of dependent processes. Further quantitative evaluation of effect, risk or opportunity is achieved by multiplying the goal proximity with the percentage probability of failures and opportunities within subordinate processes.

Connected Processes

Figure 8:
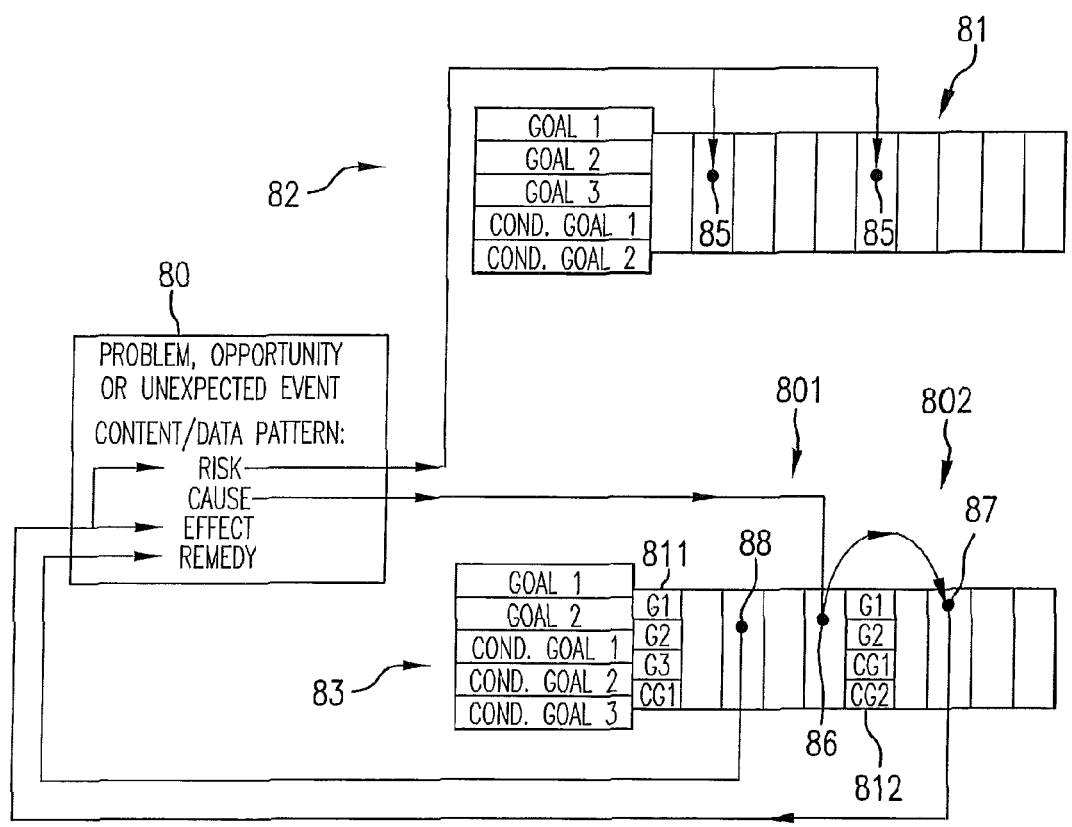
FIG. 8 schematically illustrates process nodes representing risks, causes, effects and remedies across a plurality of processes.

It should be noted that nodes representing risks, causes, effects or remedies serve to connect processes together. A simplified example of this is shown in FIG. 8.

An opportunity or unexpected event 80, as described in some content or revealed by some data pattern, has a risk, cause, effect and remedy associated therewith. In general, that risk, cause, effect and remedy will not all be found in one process. Process 81, associated with goal set 82, is distinct from processes 801, 802 that are associated with goal set 83 and subsidiary goal sets 811, 812. These processes all have nodes associated with the problem/opportunity/event 80. In the example shown, nodes 85 indicate process steps in process 81 that present a risk. Node 86 at a step in process 801 indicates a cause of the problem/opportunity/event, while node 87 indicates an effect thereof on a step in process 802. Node 88, at another step in process 801, represents a remedy.

Endemic Problems and Themes

As noted above, generic processes are less context-specific domain processes; as they reach a higher level of abstraction they contain less specific and more generalized nodes.

Generic processes can be abstracted into types; a type of generic process may be associated with a process at the domain level, and would be recognized by an experienced practitioner in a similar domain. For example, travel is a different type of generic process than managing personnel. Certain problems or opportunities, at various levels of abstraction, are considered by experienced practitioners to be repetitive over a variety of related processes. Such problems/opportunities are referred to as endemic. Endemic problems/opportunities are associated with goals, since problems and opportunities cannot be defined without first defining goals.

A type of generic process is defined by its endemic problem/opportunity set. In the field of personnel management, for example, there are many personnel-related endemic problems and opportunities dating back to antiquity, and a whole domain of processes has grown to deal with those problems and opportunities. Furthermore, high level generic processes are defined by their endemic nodes. In the Overlay, generic processes that contain generalized nodes, and/or further generalizations, are also grouped under endemic problems or opportunities. This is done because when processes become very general their process steps also become very general, and the entire process becomes difficult to define except by referring to the endemic problems or opportunities (usually called themes). In the Overlay, generic processes are defined by the set of abstracted endemic problems or opportunities that they encompass.

In assessing process similarity, an additional similarity criterion is the endemic problem(s) found in generic processes or process steps. Two apparently different process steps with some very high level similarity can found to be similar if they suffer from the same expected problems or opportunities of an abstracted nature.

High level endemic problems or opportunities (themes) serve to organize lower level endemic problems more specific to a domain, which in turn serve to organize an unrestricted number of levels of endemic problems in an unrestricted number of domains. Endemic problems or opportunities (themes) also organize high level generic processes, which in turn organize an unrestricted number of lower level generic processes more specific to domains.

Words used to describe generic processes are often shorthand for a series of goals and associated endemic problems that would take too long to express in natural language. Therefore groups of endemic problems at various levels of abstraction can have names associated with generic processes at various levels of abstraction.

Objects and Contexts

As discussed above with reference to FIG. 6B, objects and contexts alter the effect of the nodes on the process completion and the satisfaction of a goal. The nodes may become more or less likely to affect the process and its goals as a result of the context or object being different. In some cases, the process nodes are different when the process is very specific to a domain and has very specific contexts and objects. Context and objects in turn are affected by the actors and their attributes (or enterprises or enterprise departments and their attributes). Accordingly, different actors will generally have a different effect on the same process due to differences in object or context. The context or object itself may introduce more or less probability of affecting the process goal(s) or dependent process goal(s).

Object and context changes have effects both on processes and on goal proximity. Goal proximity varies in accordance with processes. But processes involve objects and contexts that may be different in different domains while the process is otherwise very similar. Therefore, for ease of adaptation of the Overlay from domain to domain, the Overlay incorporates relationships between object contexts and their processes according to the domain, so that in a new domain the system will highlight those objects and contexts that are different and may require reassessment of the goal proximity of each process step, especially when such steps are affected by the object or context difference. For ease of adaptation from domain to domain or enterprise to enterprise, the Overlay may also include relationships between context and objects and actors, users, and other elements of the cognitive structure.

Objects and contexts can be generalized or broken down into constituents, and can have relationships between them. Objects and context relevant to the enterprise have generalizations and constituents, as well as relationships between them, which vary according to the goals and associated processes or plans in which they play a part.

The degree to which the system requires all or part of the attributes to be dynamically related to each other is based on the experience and requirements of each domain, and on the client application of the system. When not all the attributes are dynamically active, the default status is to hold constant the dynamic interrelationship of attributes with the entity they would normally affect. For example, when actor attributes are considered average for the sake of convenience, then their effect on the probability of problems and opportunities arising in a process step is neutral. In another example, when the redundancy of a resource used in a process step is average, then the proximity of that process step in affecting the goal is average. The effect of attributes is average when experts in the processes involved consider them average for that domain.

Objects and/or contexts, as well as time-related designations of contemporaneous events, serve to determine whether two indications of a similar event are in fact the same event. This is important when the goal of the search for relevant information is to find content and data contemporaneous with that event.

Goal Hierarchy and Goal Conflicts

An investigation of the goal hierarchy and conflicts between goals in a process is required to determine which subordinate process step is more important in any one circumstance. The more consistently the process is applied, the more consistent the goal hierarchy, and the more attention is paid to designing the process to avoid problems due to goal conflicts. When a process is varied and becomes more like a plan of action with new process steps and new goal structure, then the goal hierarchy and goal conflicts need to be re-established, and new process steps applied to mitigate the negative effect of the goal conflicts and inappropriate results as a consequence of poorly maintained goal hierarchy.

Overlay Relevance Model: Goals, Processes and Nodes

It is useful, but not essential, to have a consistent relationship between goals, processes, and nodes (referred to herein as a relevance convention). If the relationships between goals, processes, and nodes seem consistent for Overlay users but do not follow a convention, the relevance results (that is, cases of experience returned by the relevance engine) may still be highly satisfactory because current practices generally do not group goals, processes and nodes by any consistent convention. A relevance convention used in accordance with an embodiment of the disclosure is detailed below.

Node Attributes

Node attributes help define nodes so that nodes may be used to draw similarities between processes and similarities between cases of experience. This is normally done only by expert users of the system. Node attributes may be grouped as follows:

(1) Goals and actors: Goal conflicts may exist between actors that lie behind the nodes and the processes designed to overcome these conflicts. For example: A legal contract is designed as a process for agreeing on how conflicts can be avoided or adjudicated; a machinery design is a process that overcomes the conflict between profit and cost of a machinery product; a taximeter is a process automation that overcomes the conflict between the taxi service business and the client regarding prices.

Goal conflicts can exist between the goals of different actors and/or between main goals and conditional goals. A further type of goal conflict can exist between a goal and obstacles existing in the environment, while the goal is assisted by the assets available in that environment. Assets and obstacles are context specific and are affected by a specific goal conflict. For example, the conflict between quality and cost affects the quality and efficiency of manufactured products; each product has particular assets and obstacles affected by this goal conflict. The customary goal conflict of quality versus cost, within the manufacturing processes and manufacturing machinery functions encompassed by the product, has nodes associated therewith. The nodes associated most closely with this goal conflict are the cause nodes of any product malfunction. The goal conflicts therefore are closely related to the nodes in the cause processes.

(2) Assets and obstacles: Assets and obstacles are the context and process specific elements that are most closely associated with each node. They are elements within processes that change in accordance with the context, but also generalize into more generic assets and obstacles when grouped in the appropriate context generalisation. Referring again to the example of manufactured products and the inherent goal conflict between quality and cost, groups of similar products with design commonalties within the same context (e.g. hydraulic fluid pumps) will have similar problems characterized by the assets and obstacles affected. In addition, due to design variations between products in the same contextual groups, there will also be assets and obstacles associated with problem nodes that are different between the products. Where this is the case, the context structure needs to separate the products further into individual products, with individual specific problems and associated assets and obstacles. This means that the nodes of this very particular contextual grouping do not generalize across other contexts. However, all will be grouped under the goal conflict of quality and cost. Accordingly, context groups govern the assets and obstacles that are active in active problem or opportunity nodes. Some contexts involve more generic nodes and generalize more readily; some remain particular to very specific contexts.

The relevance of assets and obstacles to the node are governed by the context structure. Nodes are the manifestation of the assets facing obstacles that may cause a problem or opportunity in a process. When the nodes are not the result of goal conflicts between actors, but instead between the goals of the process and the assets and obstacles of the context in which the process takes place, then the relevant assets and obstacles are those that are active when the problem or opportunity is active.

(3) Cause nodes and affected nodes: Cause nodes accompany the affected nodes, and describe why a given node is active as a problem or opportunity or event. Nodes that may be active in cause processes, as well as nodes that may be active in the affected processes, are used to identify node attributes.

(4) Relationship between goal conflicts and cause nodes: Goal conflicts that belong to the same abstracted group are caused by nodes with similar abstracted attributes, while the affected node attributes may be more varied and less easy to group without specialized domain knowledge. The cause and effect relationship between cause nodes and affected nodes is helpful in associating nodes from one context specific domain to another context specific domain.

Expert User Process

Expert Overlay users, when populating the cognitive structure of the system, assign node attributes at various context specific levels of abstraction. The expert Overlay users then assign node attributes to higher level abstractions. Computerized methods may also be used to model node attributes to assist the expert users.

Identifying Nodes

Figure 9:
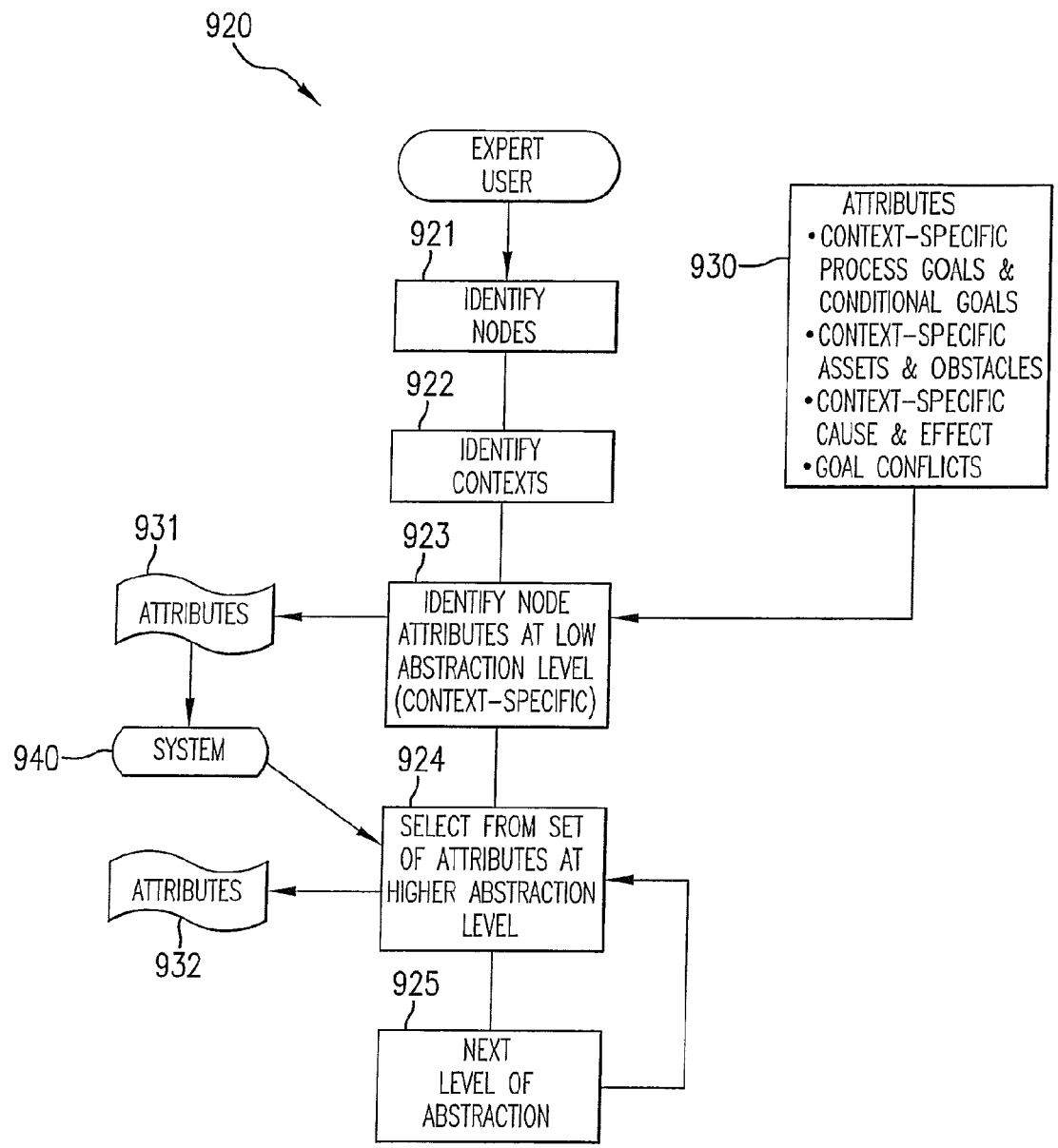
FIG. 9 is a flowchart illustrating a procedure by which an expert user may assign node attributes at various context specific levels of abstraction.

The following procedure (illustrated in FIG. 9) may be followed by an expert user 920 to identify nodes at various levels of abstraction, in accordance with the disclosure.

(1) Identify nodes: The expert overlay users identify the nodes found in a context specific process whose similarity to other processes is sought (step 921).

(2) Identify context relating to each node at the various levels of abstraction (step 922). This is achieved through the domain (context specific) process model particular to the enterprise in which the process in question and the processes which depend on it are analyzed for context specificity.

(3) Identify lower context level node attributes (step 923): The expert overlay users identify the node attributes as described above as node attributes 930: Attributes 931 include context specific process goals and conditional goals; goal conflicts; context specific assets and obstacles; and context specific cause and effect of the nodes for the process whose similarity with other processes is sought.

(4) Select from a set of abstracted lower context level node attributes (step 924): In other words select from a pre-populated set of node attributes at a stage of context abstraction above the level in steps 1 to 3. The overlay system 940 shows the user a selection of higher level node attributes; the expert user selects higher level attributes 932 to match the lower level attributes of the nodes identified in step 3.

(5) Select for a higher or highest context level set of node attributes (step 925): The overlay shows a selection of higher or highest context level enterprise node attributes. The expert user selects the highest level attributes that match the attributes identified in step 3.

The above series of steps can be applied to a selection of nodes so that process similarity can be identified, or it can be applied to a single node so that nodes similarity can be identified.

Processes and their Relationship to Nodes

Process similarities are identified by comparing the attributes of the nodes of the contextually specific process to higher level abstracted node attributes. For example: A context specific process, such as seeing a target in a military training exercise, has several nodes (e.g. inability to see due to physical obstructions, inability to see due to bad light, inability to see due to scope malfunction, etc.). These in turn can be abstracted by an expert Overlay user into higher level node abstractions (e.g. inability to see due to obstacles, inability to see due to atmosphere, inability to see due to loss of sight enhancing equipment). The new abstracted node cluster yields a higher level generic process which is an abstraction of the specific process of seeing a target.

The reverse of abstraction may be performed, to match higher level generic processes to lower level context specific processes via node attributes, but in reverse order by taking more generic nodes and their attributes and relating them to context specific nodes in the other domain. In this way two process in different domains or in similar domains but different contexts can be matched for similarity. This similarity in turn provides the ability to draw on experience in one context specific domain to predict problems or opportunities in another context specific domain.

Identifying a Similar Process

Figure 10:
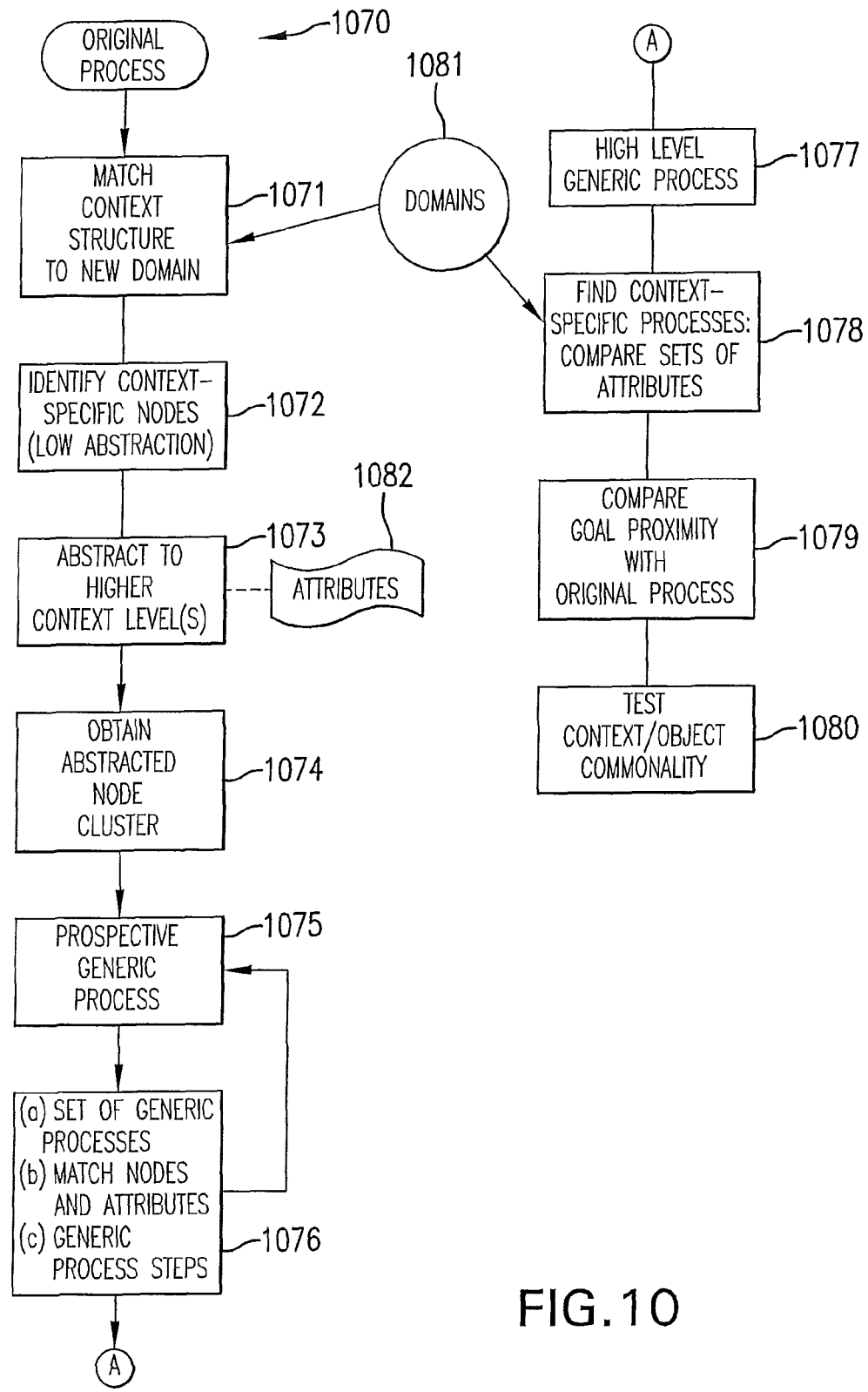
FIG. 10 is a flowchart illustrating a procedure for identifying generic processes and processes similar to a given original process, according to an embodiment of the disclosure.

The following procedure (illustrated in FIG. 10) may be followed by an expert user to identify processes in other domains which are similar to an original, context specific process 1070.

(1) According to this procedure, a generic process is first identified, as follows: The context specific process in an enterprise is taken with its context structure. The context structure is identified and matched to a new domain in which the process will be compared (step 1071). This means the context abstractions chosen need to match across as many domains as envisioned to be working in one overlay system. Then the context specific nodes are identified at the most specific level of context (step 1072). These context specific nodes have been assigned node attributes 1082 by expert users of the overlay using a specific method as shown above. The nodes and node attributes are abstracted to higher context levels by the expert Overlay user (step 1073), to obtain a new abstracted node cluster (step 1074). The new abstracted node cluster yields a higher level generic process (step 1075) which is an abstraction of the original context specific process.

The process that involves the largest number of original nodes abstracted to higher contexts is the highest level generic process related to the original process. The generic process is identified iteratively (steps 1076, 1075): a) by expert users who name that process and assign it to a set of generic processes; b) by expert users who match the nodes and node attributes as described in the method above to verify that the process is unique and does not pre-exist in the set of generic processes by having the same nodes and node attributes; c) by expert users who may break down the prospective generic process into generic process steps, apply the above mentioned process regarding matching node attributes in these smaller constituent steps (with fewer nodes), and then assemble the process from its constituent steps to a larger generic process. However, assembling a larger generic process from smaller ones restricts the level of generality of the process since it will need to have the same constituent steps. The approach of assessing generality of smaller constituent steps is more suitable when the steps cannot be easily changed as in machinery functions and other more rigid processes. Starting with more complex processes with many constituent nodes is more suitable for planning where the process step have yet to be defined.

In other words, the level of process granularity (to which the above methods regarding node attributes and their abstraction into higher level processes are applied) can vary according to the expert user's choice or focus. If the methods are applied to lower level subordinate process steps (more granular) within larger processes, then the process similarity can be taken to higher level processes by goal proximity and matching the number of subordinate processes. If the methods applied are applied to higher level processes (less granularity) there can be process similarities drawn at higher levels with less emphasis on similarity of subordinate steps. Each method has different advantages. The more granular method is better for comparing processes with similar steps and similar goals, the less granular method is best for comparing processes of similar goals but different methods.

(2) Finding a similar process in many different contextually specific domains: After the highest level generic process is identified (step 1077), the expert user proceeds to find more context specific processes of which it is an abstraction. In general, the high level process will be generic to context specific processes in different domains 1081.

To test which context specific processes fit closest, find which context specific processes contain the most nodes which have the closest set of node attributes to those of the generic process (step 1078). This is achieved by comparing node attributes at the various levels of abstraction, starting at the highest.

(3) Apply goal proximity to compare the importance of the common processes in each respective domain (step 1079): This step is more important than the following step in instances where the effect of the process on goals it serves is a more important or more revealing similarity criterion. This similarity tests whether the new contextually specific process has a similar goal proximity to its main goal and conditional goals as does the original process in another context. This includes dependent processes which are potentially affected by the nodes whose abstractions are common between the contextually specific processes being compared. This comes before context similarity when the importance of a process needs to be similar between the processes being compared.

(4) Apply a node attribute test (step 1080) to find the context/object cluster that is most susceptible to the nodes selected. This requires knowledge of the workings of such context and objects across domains (usually a much more narrow range of domains) so as to ascertain the susceptibility to the nodes selected. This step is more important than the preceding step in instances where the context specific obstacles and assets are more important as a relevance focal point, and also in cases where the similarities across context of the nodes of a particular case are more important than similarities of a process. In other words, the selection of nodes is narrower and does not fully satisfy the nodes of a broad process but may group a larger number of processes and contexts with the node of interest in common. For example, most machinery failures have case nodes that apply to particular machines with design, manufacturing and operating criteria that would be susceptible to the same failure. To find these other machines the nodes selected in the generic process selected need to be fewer and the expert user must make the match of node attributes based on knowledge of these other machines and their susceptibilities.

It should be noted that in practice finding similar single nodes across contexts/domains is just as important as finding clusters of similar nodes. In an embodiment, this problem may be dealt with by identifying first and second contexts for the node. The node is specific to the first context, so that the node is characterized as a first context-specific node. The second context is at a higher level of abstraction than the first context, so that the node is not specific to the second context. There will then be two sets of node attributes associated with the node, in accordance with the first and second contexts respectively. At least one generic node may then be identified, where the generic node has attributes in accordance with high context level enterprise node attributes.

Populating the System with Cases

Figure 11:
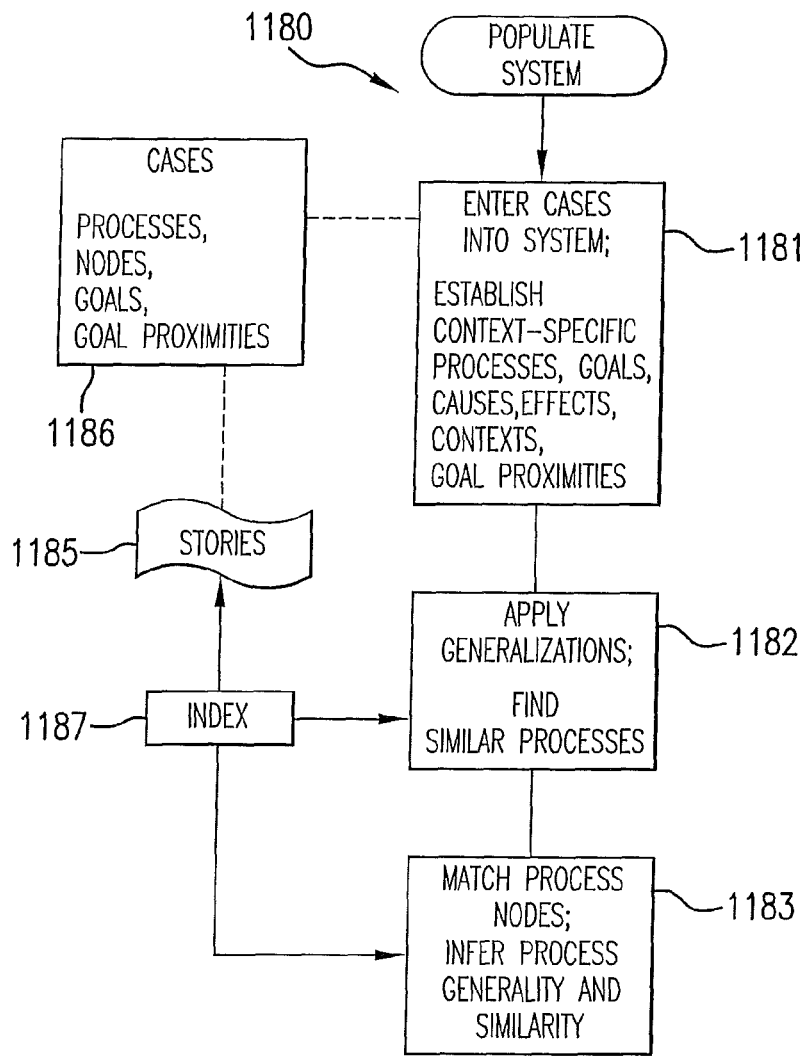
FIG. 11 is a flowchart illustrating a procedure by which an expert user may populate a system with cases or recounted stories, according to an embodiment of the disclosure.

FIG. 11 schematically illustrates a procedure 1180 for populating the system with cases (thereby facilitating solving problems or exploiting opportunities using the Overlay, by making available the collective experience of the enterprise). The user populates the system by entering process, nodes, goals and goal proximities (step 1181). These may be entered using the experience of industry practitioners. Cases 1186 are entered using assistance from an index engine 1187 to index stories 1185 recounted by experts and/or recorded by the enterprise. Nodes are the problems and opportunities manifested in discussions about causes, effects, remedies, and explanations as found in the cases (recounted stories). In this exercise context specific processes, contexts, goals, causes, effects and goal proximities are established.

Abstracting Processes: Cross-Contextual Similarity

In a second stage of populating the system, expert users of the Overlay apply generalizations of processes and generalizations of nodes (step 1182) to enable non-expert users to find similar processes between domains and across contexts. Experts using indexing assistance from the Overlay may match nodes through their attributes to infer process generality and process similarity (step 1183).

Overlay Method Steps

Figure 12:
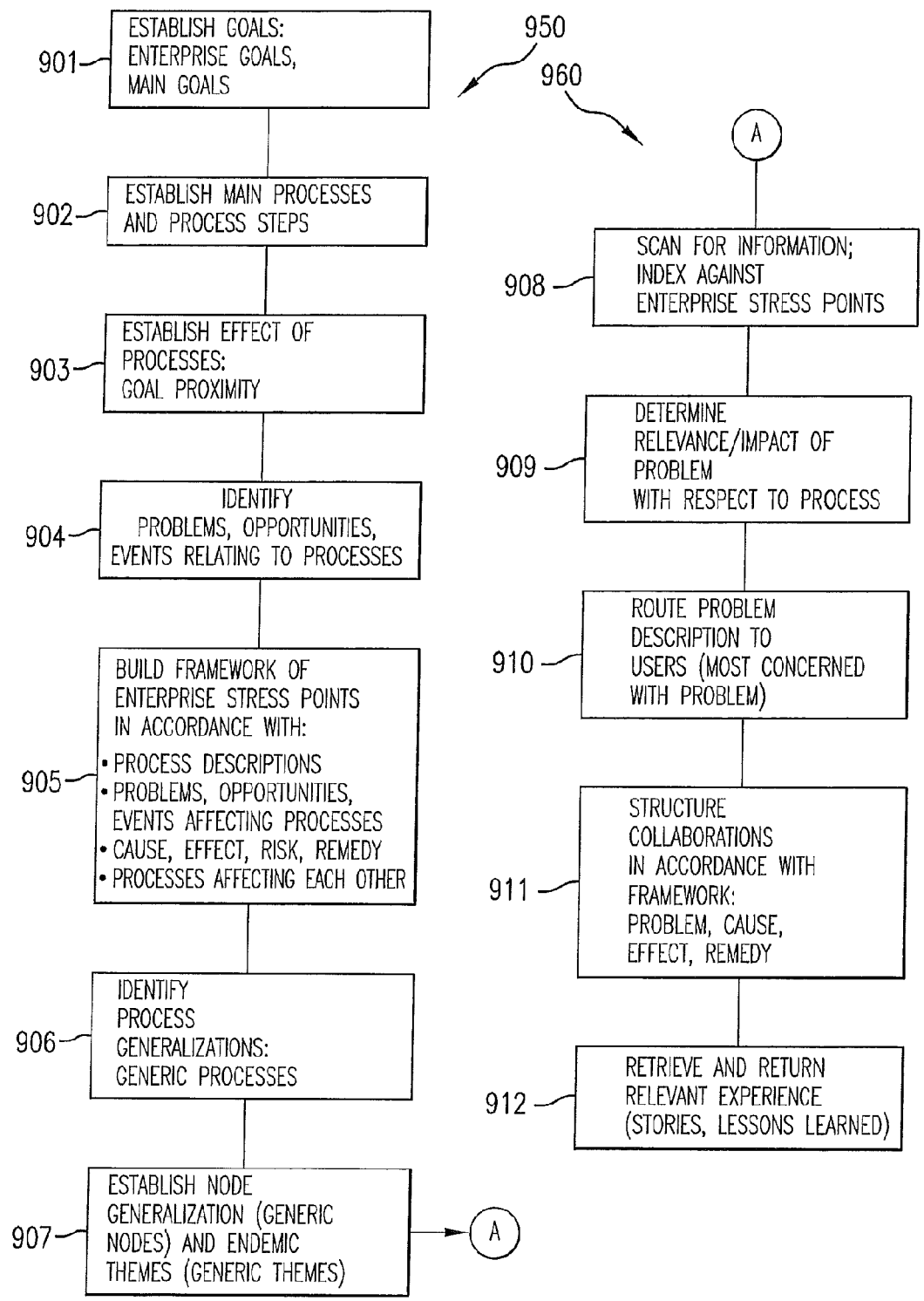
FIG. 12 is a flowchart illustrating a method in which software builds and utilizes a framework of enterprise stress points, according to an embodiment of the disclosure.

FIG. 12 is a flowchart illustrating how the Overlay system finds problems in the enterprise, and provides users with relevant previous experiences; that is, lessons learned from prior risks, causes, effects, and remedies (also called stories).

The method performed by the Overlay is centered around building a framework of enterprise stress points. The goals of the enterprise (enterprise goals and main goals, as mentioned above) are established in step 901. The various processes designed to achieve those goals are established in step 902. The effect of the processes (goal proximity) is established in step 903. In step 904, problems, opportunities and events relating to the processes are identified. In step 905, a framework of enterprise stress points is built, in accordance with: the process descriptions; problems, opportunities, and events affecting the processes; causes, effects, risks and remedies; and how the processes affect each other.

It should be noted that building the framework includes identifying similar processes. As discussed above, this involves identifying common process steps and/or applying other criteria to the various processes.

The processes are analyzed in order to identify process generalizations and thus to identify generic processes (step 906). In step 907, generic nodes and endemic themes are identified from the processes. The enterprise internal content and enterprise data are scanned, and the scanned content is indexed against the enterprise stress points using an indexing engine (step 908). The system determines the impact of a given problem on a given process, and routes a description of the problem to the users most concerned with the problem (steps 909-910). The system proceeds to structure collaborations in accordance with the stress point framework, focusing user collaborations on the key points affected by the problem, the problem's causes, and the problem's remedies (step 911). From the indexed information, the system retrieves relevant previous experience and returns those relevant stories to the users (step 912).

Problem Solving Using the Overlay

Figure 13A:
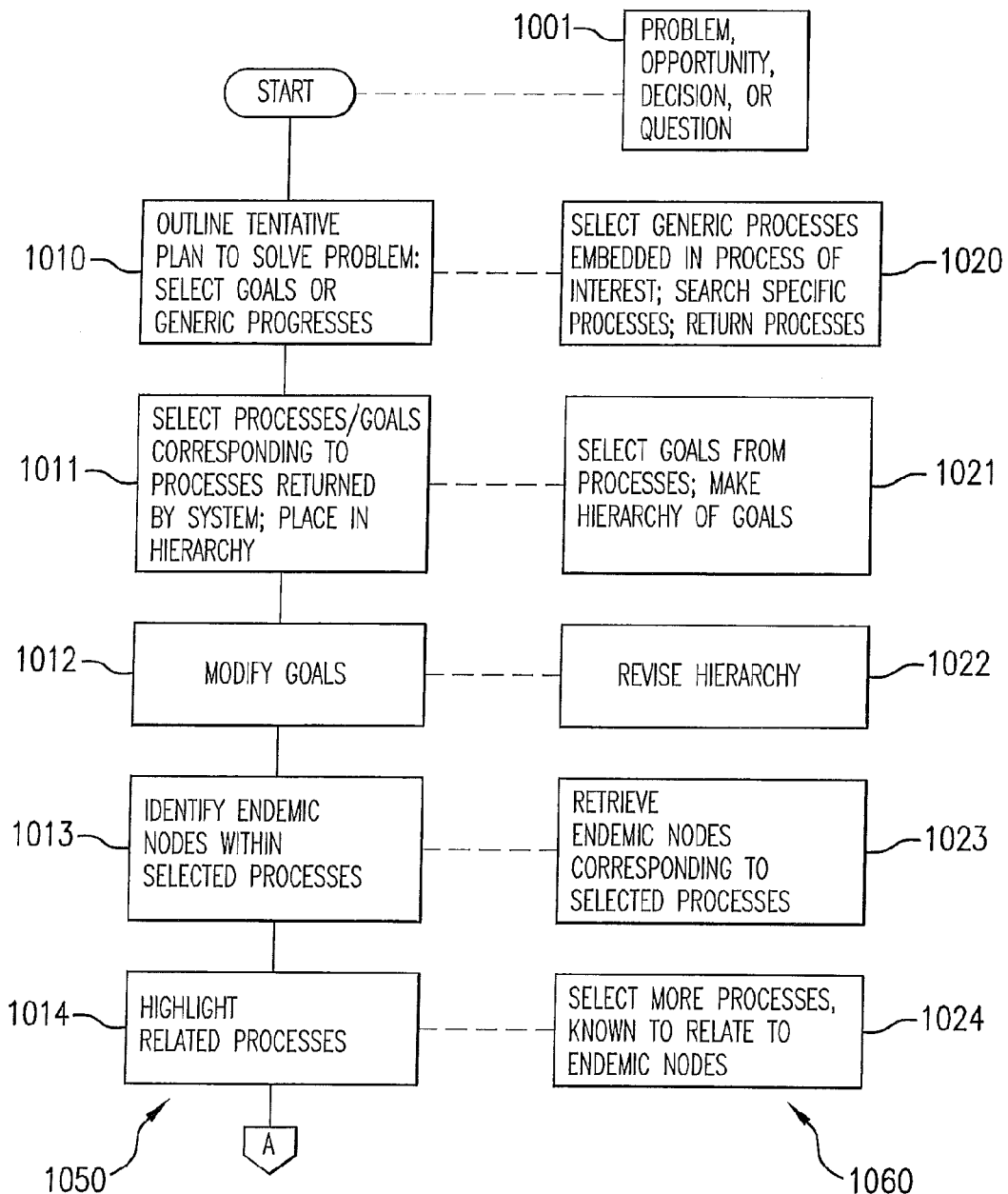
FIGS. 13A and 13B are connected flowcharts illustrating steps undertaken by a user of a system embodying the disclosure, in order to solve a problem or exploit an opportunity.
Figure 13B:
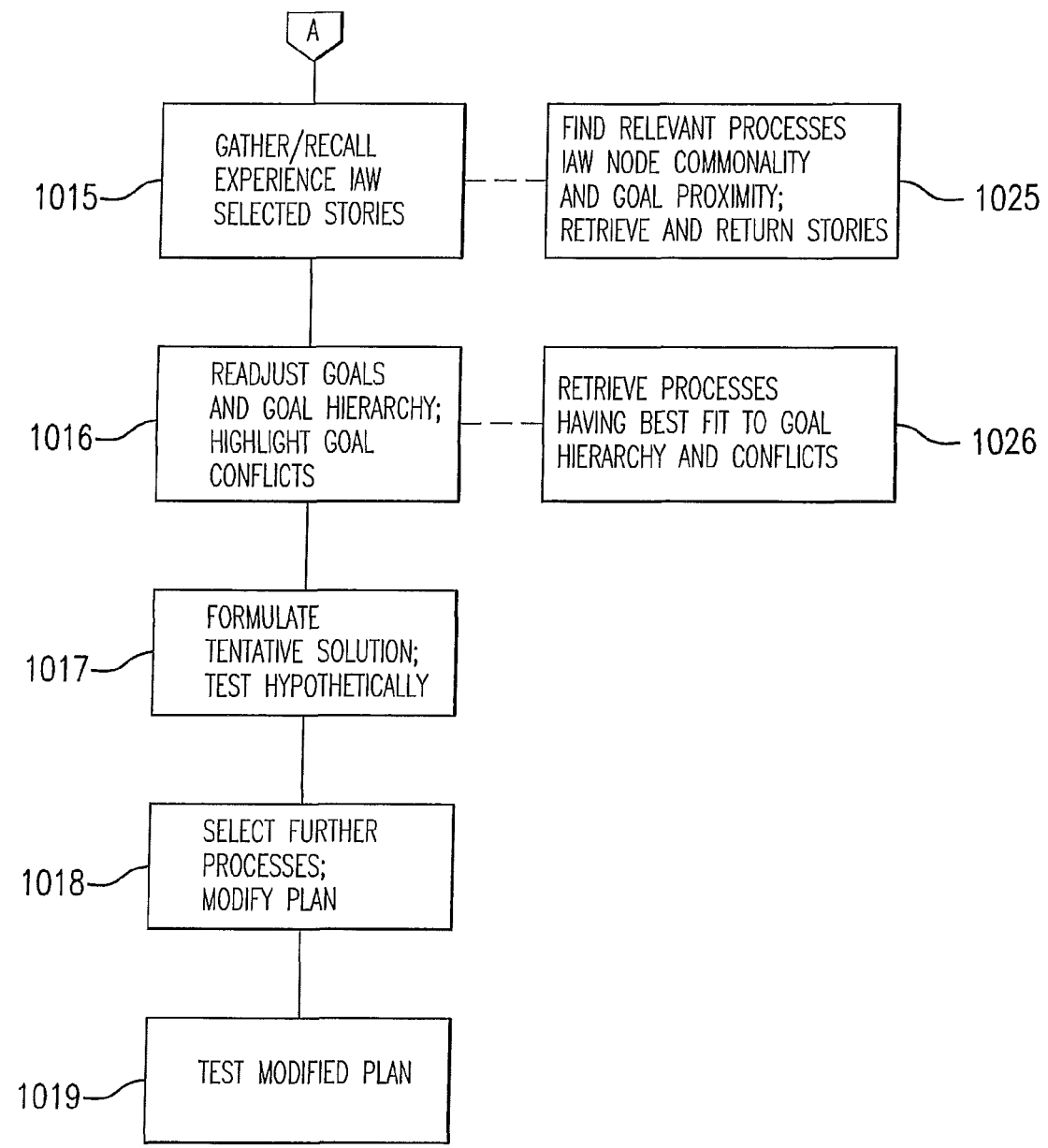

A method for solving a problem (alternatively, exploiting an opportunity, making a decision, or answering a question) using the Overlay system, from a user's point of view, is illustrated in the connected flowcharts shown in FIGS. 13A and 13B.

It should be noted that the method described herein is iterative, and the order of steps depends on how close the problem or opportunity is to a previous problem or opportunity and how well the problem or opportunity has been managed in a known process. If the problem or opportunity is not well known and the process with which it can be remedied is not well established, then the order of steps and emphasis is different from that described herein.

A user dealing with a problem (or opportunity, decision or question) 1001 first outlines a tentative plan in his or her mind around the problem to be solved (step 1010); the plan is devised outside the system. The corresponding system action (step 1020) is to let the user select a few generic processes which the plan organizes. These processes can be returned in a variety of ways by including a set of minor word searches using preconfigured searches on generic processes or goals; in other words, to provide a rudimentary concept search on the cognitive structure. Usually a narrower scope of process selection, resulting in more specific processes, is required than that returned by a goal search, more narrow than that returned by a generic process search, and broader than that returned by a specific process search.

In step 1011, the user selects a narrower set of processes and then the user selects the goals corresponding to the processes returned by the system, and the system makes an initial hierarchy of goals (step 1021). The hierarchy of goals is modified (step 1012; system action in step 1022), taking into account the actors involved in the processes and how their goals affect the hierarchy and how the goals selected conflict with each other. The fewer processes selected (which in turn depends on how well known and established the problem or opportunity is and how well known and established the remedial action process is), the more it is likely that the goal conflicts and hierarchy will be the same as in the process selected.

In step 1013, the user retrieves the endemic nodes within the selected processes (that is, the processes selected in the outlined plan). The corresponding system action (step 1023) is to retrieve the endemic problems for the set of processes. The user highlights related processes, using the endemic problems; the system selects still more processes, which are known to relate to the identified endemic nodes (steps 1014-1024). The user then selects stories and experiences from the selected processes, which are organized by process problems/opportunities and endemic problems/opportunities. The stories are retrieved by finding a relevant group of processes, according to node commonality and goal proximity to related processes (steps 1015-1025).

As the user gathers past experience and is reminded of his or her own experiences by the stories (content and data related to problems, opportunities and interesting/unexpected events), the system assists the user to readjust his goals and goal hierarchy and to highlight goal conflicts, so as to enable retrieval of processes best fitting the resultant goal hierarchy and conflicts (steps 1016, 1026).

Using the returned stories, the user formulates and tests a tentative solution (step 1017). The user then selects further processes, modifies the outlined plan, and tests the modified plan (steps 1018, 1019). The plan is not necessarily retained in the system, other than described in a discussion with colleagues on a common discussion document managed by the Overlay. The plan may be retained if it is advantageous to do so; for example, if the experience is considered useful for future reference, especially if the plan has a goal hierarchy that under certain circumstances is better than the standard process it replaces. The retrieved stories help the user to devise the best possible plan using the collective experience of the participants. The Overlay helps retrieve past experiences via stories, and helps co-ordinate the right stakeholders in the discussion.

Overlay System

A system for executing the Overlay includes an indexing structure (or indexing engine) which defines methods of achieving relevance between nodes or enterprise stress points. The indexing structure contains word patterns and data patterns including business objects relevant to the nodes or enterprise stress points. The system also includes a language parser and scanners which are used to scan existing or new content and assign that content to process nodes. The indexing structure of the Overlay system helps users find information relevant to enterprise stress points, more effectively than using conventional search engines.

It should be noted that relevance of content in the enterprise is determined exclusively by addressing process nodes. The user defines a cognitive structure to perform indexing; critical criteria for relevance are defined within the cognitive indexing structure.

Figure 14:
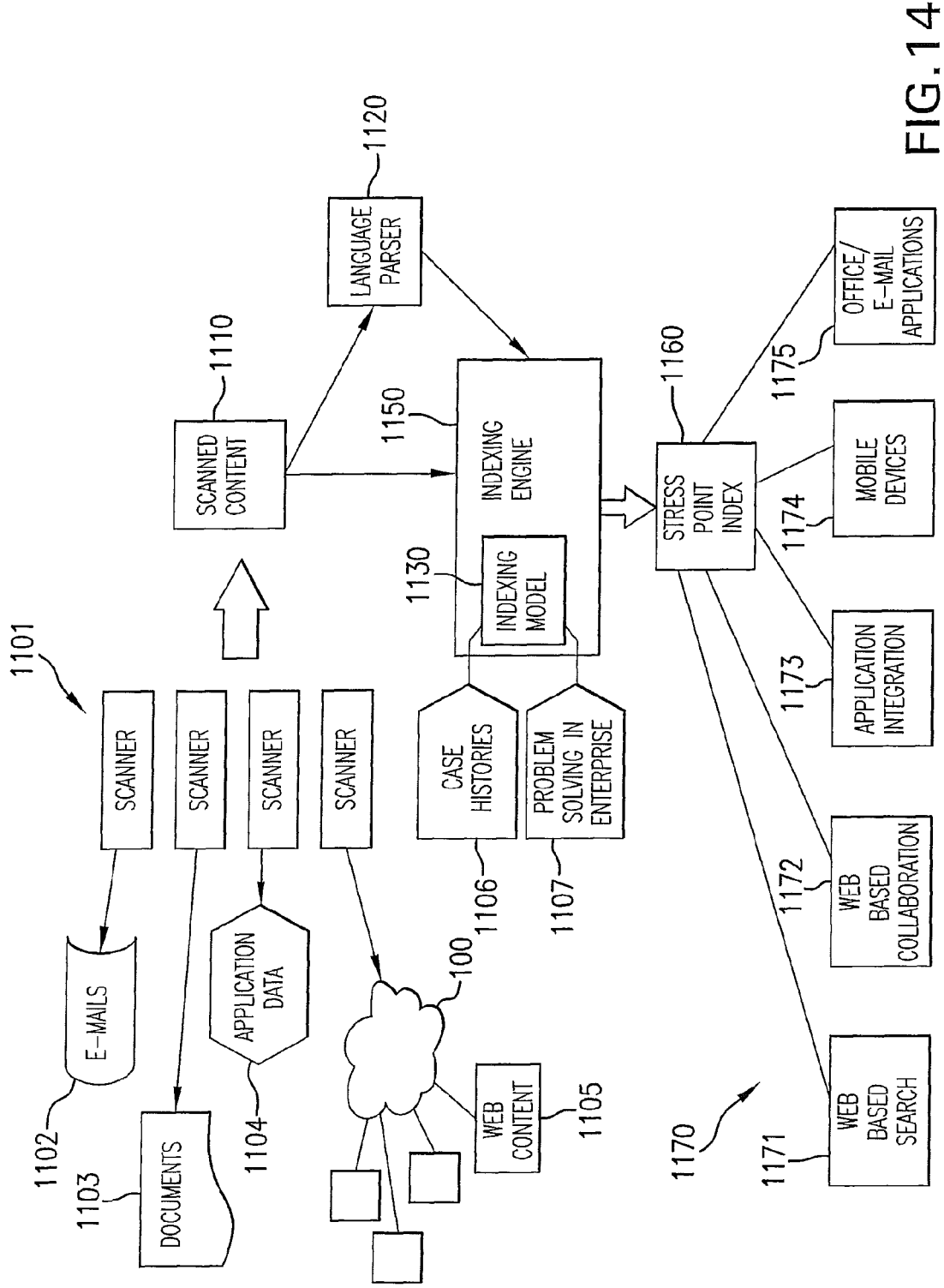
FIG. 14 schematically illustrates a system for gathering information and indexing information against the enterprise stress points, according to an embodiment of the disclosure.

An implementation of the Overlay software, in accordance with an embodiment of the disclosure, is shown schematically in FIG. 14. The Overlay includes content scanners 1101 for scanning enterprise content and enterprise data and related external data as well including business objects; a language parser 1120; and an indexing engine 1150. The scanners obtain content from a variety of sources; for example, e-mails 1102, documents 1103, application data including business objects 1104, and Web content 1105. The language parser 1120 identifies concepts within the scanned content 1110, and cooperates with the indexing engine 1150 to assign a stress point relevance to those concepts. In the case of application data the stress point relevance is preconfigured, so the Overlay looks for specific data in specific locations within the application. The resulting stress point index 1160 supports a range of user interfaces 1170. The user interfaces utilize the stress point index to alert users to problems, enable collaboration between users, restrict the returned information to processes for which the users are stakeholders (even if the information is as yet only directly related to subordinate processes for which they are not stakeholders); and retrieve previous related experiences. In the embodiment shown, the user interfaces include a Web-based search interface 1171, a Web-based collaboration tool 1172, a portal-based interface 1173 for application integration, a mobile device interface 1174 for alerts, collaboration and searches relevant to the problem, and an interface 1175 to integrate the stress point index to one or more desired office applications.

The indexing engine indexes information against the enterprise stress points, using indexing model 1130. The indexing model is constructed using case histories (stories of how the enterprise dealt with stress points in the past) 1106 and current cases of problem-solving in the enterprise 1107. Both current and past cases are thus used to populate the system. Analysis of current cases creates the indexing for the case against the cognitive structure. Past cases can be entered as experiences as a separate process not directly a part of enterprise problem solving.

Furthermore, in populating the system the indexing engine performs cross contextual referencing; this enables the system to be populated with experiences and content related word concepts in new domains, by using the generic aspect of processes and generic nodes from previously populated domains. Context specific nodes define more generic nodes. These more generic nodes in turn define generic components of context/domain specific processes. These generic process components and their generic nodes, will exist in the new domain at some level of generality and thus indicate specific nodes in this different context/domain.

The indexing engine may provide indexing services to other software products, including third-party products such as: content management systems; search solution products; ERP systems; or any other system that would benefit from the addition of stress point relevance software.

In an embodiment, the indexing engine 1150, which is the core of the Overlay, is a middleware service provided via Web services.

A system according to the disclosure may be used to
identify content relevant to nodes;
understand the enterprise by relating nodes to each other in the cognitive structure;
solve problems in the enterprise; and
find stray information in the enterprise.
Some benefits of using the Overlay system are as follows:
assess process similarity between two processes being compared;
describe processes and plans relevant to the enterprise;
find related information about problems and opportunities;
find stray information (unresolved notices) about problems and opportunities;
assess risk and consequences of problems and opportunities;
anticipate problems and opportunities:
diagnose problems and opportunities;
apply remedial action plans to problems and opportunities;
make strategic plans about problems and opportunities;
give users insight into causes and effects in an industry;
permit users to be creative in dealing with problems and opportunities;
aid users in explaining complex phenomena about the workings of an enterprise or the environment in which the enterprise operates and which significantly affects the enterprise;
aid experts assisting companies in solving problems or taking advantage of opportunities for that company; and
find relationships between elements of a cognitive structure based on enterprise activities.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. A system for finding information relevant to a process relevant to an enterprise, the system comprising:
   a computing device including a model of the enterprise encoded on a non-transient digital storage medium, where processes of the model have nodes characterized as model nodes, so as to enable relevance to be determined between model nodes and between content and data and model nodes;
   an electronic scanner effective to scan said content and data of the enterprise with respect to word patterns and data patterns associated with nodes of the enterprise.

2. The system of claim 1 wherein:
   an electronic indexing engine is configured to index information obtained by said electronic scanner with respect to a process node and to rank indexed information according to relevancy to an enterprise stress point; and
   a user interface capable of presenting indexed information, whereby said indexed information is effective to aid in at least one of solving the problem, exploiting the opportunity, or understanding the event.

3. The system of claim 2 wherein said information includes at least one of
   content methods normally used for communication in the enterprise such as e-mail communication within, to or from the enterprise;
   documents used by the enterprise;
   application data related to the process; and
   Web content or data accessible to the enterprise.

4. The system of claim 3 wherein the process node corresponds to records of discussions or data relating to at least one of a cause, effect, risk, or remedy or combination thereof associated with the process node.

5. The system according to claim 4 wherein at least one of histories of past cases and information relating to present cases including past and present experiences, respectively, of the enterprise stress point is encoded on said digital storage medium.

6. The system of claim 2 wherein:
   said computing device is configured to, in response to an input, provide relevant information by giving access to contemporaneous information and historical information directly related to said problem or opportunity and retrieving information including a description or discussion of contemporaneous information or previous experience relating to the problem or opportunity; and
   said user interface configured to provide an alert that there exists a problem or opportunity associated with a process node when said computing device determines such an alert should be issued utilizing the relevance index, said alert being weighted to the degree of effect on the process to which the process node belongs and also the effect on processes connected more remotely by cause and effect, which cause and effect weighted by goal proximity, ensures that stakeholders of more remotely affected processes can be alerted in accordance to goal proximity.

7. The system of claim 6 being effective to return contemporaneous and historical information related to stakeholder processes and information related to subordinate processes if that information is likely to cause risk to the stakeholder process.

8. The system of claim 2 wherein a plurality of enterprise stress points are interlinked by at least one of cause, effect and similarity.

9. The system of claim 8 wherein the relevance of content or data to the enterprise is determined by said computing device by relating that content or data to at least one relevant enterprise stress point and via the enterprise stress points to at least one element of cognitive structure assigned to said enterprise stress points.

10. The system of claim 8 further effective to access and retrieve information relevant to a node of interest, including access information about similar processes nodes.

11. A method for finding information found within an electronic information system containing digital information utilized by an enterprise, relevant to a process performed by the enterprise or relevant to an enterprise stress point of said process, the enterprise stress point being a problem, opportunity or event associated with at least one process step of said process, the method embodied in a system capable of transacting the steps comprising:
providing a non-transient digital storage medium and a processor;
retrieving information related to activities of the enterprise;
encoding said information on said digital storage medium;
assessing said information utilizing said processor with respect to at least one predictive pattern associated with a predefined set of enterprise stress points;
electronically indexing said information with respect to the enterprise stress points; and
presenting said indexed information in a manner effective to aid in at least one of solving the problem, exploiting the opportunity, or understanding the event.

12. The method of claim 11 wherein said step of retrieving includes identifying a process node that is presenting a current risk and retrieving an amount of information relevant to said process node and said risk.

13. The method of claim 12 wherein said step of retrieving includes scanning content or data of the enterprise against the predictive patterns and retrieving at least one of current and historical data related to the enterprise stress point.

14. The method of claim 13 wherein input including a set of enterprise stress points is received by said processor, wherein at least one of the enterprise stress points is linked to at least one other of the enterprise stress points by cause and effect.

15. The method of claim 11 wherein prior to the step of retrieving, receiving to the processor input that an enterprise stress point has been selected and thereafter the retrieving step is retrieving at least one of contemporaneous information, contemporaneous historical information of past experience, and similar experience.

16. The method of claim 11 wherein said assessing step includes identifying an enterprise stress point that is presenting a current risk and the retrieving step comprises retrieving contemporaneous information.

17. The method of claim 11 wherein said assessing step includes the input of predictive patterns effective to identify at least one of a cause, effect, risk, or remedy related to the enterprise stress point.

18. The method of claim 11 wherein the information presented is relevant information including at least one of a description or a record of a discussion of content or data of a current experience, contemporaneous experience, a previous experience and a similar experience of the enterprise or a similar experience of another enterprise regarding said problem, opportunity or event.

19. The method of claim 18 wherein the relevance of an item of content or data to the enterprise is determined in accordance with relation of said item to the enterprise nodes or stress points.

20. The method of claim 19 wherein said information includes at least one of
content methods normally used for communication in the enterprise such as e-mail communication within, to or from the enterprise;
documents produced by the enterprise;
application data related to the process; and
Web content or data accessible to the enterprise.

21. The method of claim 14 wherein the processor receives an input representing an impact of the completion of a process step with its associated nodes on achievement of a goal related to a directly dependent process with its associated node, the impact characterized as a goal proximity of said process step to the dependent process step.

22. The method of claim 21 wherein the process node corresponds to a risk or opportunity to its immediately dependent process steps and associated node, and further comprising assessing said risk or opportunity by:
determining the goal proximity of the process step and associated nodes with the immediately dependent processes and their nodes,
determining a value associated with each goal related to said dependent process with associated nodes, each said goal accordingly being potentially affected by failure or success of the process subordinate to it which includes said subordinate process step with associated nodes,
determining a value associated with a remedial action compensating for said failure or a reward associated with success of an opportunity, and
determining a probability of said failure or success.

23. The method of claim 22 wherein assessing said risk or opportunity includes determining resources available to the enterprise in performing said process step, the resources including any available process redundancy measures.

24. A method for making an expert determination as to the similarities between at least two processes, comprising:
providing a non-transient digital storage medium and a processor;
storing on said non-transient digital storage medium a plurality of processes, each process having at least one process node connected to another process node by cause and effect;
comparing said process nodes in said processes utilizing said processor;
receiving to said processor an input that there exists a commonality between at least two of said process nodes in said processes;
encoding on said digital storage medium a record of said commonality so that the processor can compare nodes for commonality and retrieve relevant information about a similar process.

25. The method of claim 24 wherein said method is for determining similarity of process nodes in a process, in a case where the process has different contexts, comprising the steps of:
identifying the nodes associated with the process;
identifying a first context for the process, the process being specific to said first context so that the process is characterized as a first context-specific process;
identifying a second context for the process, said second context being at a higher level of abstraction than said first context, so that the process is not specific to said second context;
identifying a first set of attributes associated with said nodes and in accordance with said first context;
selecting a second set of attributes associated with said nodes and in accordance with said second context;

identifying attributes in the second set of attributes matching attributes in the first set of attributes;

establishing and encoding on said digital storage medium a set of said identified attributes, said identified attributes characterized as high context level enterprise node attributes; and identifying a generic process, where said generic process has nodes associated therewith, said generic process nodes having attributes in accordance with said high context level enterprise node attributes.

26. The method of claim 25 wherein the node attributes include at least one of a goal conflict, an asset, an obstacle, a cause, or an effect specific to each level of context abstraction.

27. The method of claim 26 wherein said step of identifying the generic process is performed iteratively by receiving iterative expert input.

28. The method according to claim 27 wherein said selecting step includes receiving input that a certain of a pre-populated set of attributes has been selected.

29. The method of claim 25, further comprising the steps of:

identifying additional context-specific processes with associated nodes of which said generic process with associated nodes is an abstraction;

performing at least one of comparing said additional context-specific processes with associated nodes with said first context-specific process with associated nodes in accordance with a goal proximity to matching goals of each respective process including dependent goals, comparing said additional context-specific processes with associated nodes with said first context-specific process with associated nodes according to commonalities with respect to node attributes associated with said processes, comparing said additional context-specific processes with associated nodes with said first context-specific process with associated nodes according to commonalities with respect to goal conflicts affecting the context-specific processes with said first context-specific process, and comparing said additional context-specific processes with associated nodes with said first context-specific process with associated nodes according to commonalities with respect to subordinate processes and embedded process steps; and identifying processes similar to said first context-specific process in accordance with a result of the at least one of said comparing steps.

30. The method of claim 29 wherein said step of identifying the specific process is performed iteratively by receiving iterative expert input.

31. The method of claim 29 wherein the enterprise has a plurality of abstracted processes nodes with associated attributes, said processes nodes organized into generic process node groups, within which said abstract process nodes are further organized into more context specific process nodes and groups.

32. The method of claim 29, further including:

receiving input that a specific generic node is of interest; and presenting on a user interface a group of context-specific process nodes having said specific generic node in common.

33. The method of claim 25 wherein, in response to a retrieval input, presenting information relevant to a node of interest, including information about similar process nodes.

34. The method according to claim 19 whereby the relevance of an item of content or data is determined by relating that content or data to a relevant enterprise stress point and said enterprise stress points is navigable via enterprise cognitive structure.

* * * * *